(12) United States Patent
Sasaki et al.

(10) Patent No.: US 10,293,684 B2
(45) Date of Patent: May 21, 2019

(54) VEHICLE

(71) Applicant: TOYOTA JIDOSHA KABUSHIKI KAISHA, Toyota-shi, Aichi-ken (JP)

(72) Inventors: Shigeru Sasaki, Seto (JP); Manabu Fujii, Toyota (JP); Shunichi Shibasaki, Toyota (JP); Norihide Hakamata, Anjo (JP); Shinsuke Yano, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/464,551

(22) Filed: Mar. 21, 2017

(65) Prior Publication Data

US 2017/0282709 A1    Oct. 5, 2017

(30) Foreign Application Priority Data

Apr. 1, 2016 (JP) ................. 2016-074221

(51) Int. Cl.
*B60K 15/07* (2006.01)
*B60K 15/03* (2006.01)
(Continued)

(52) U.S. Cl.
CPC ........ *B60K 15/07* (2013.01); *B60K 15/03006* (2013.01); *B60L 11/1898* (2013.01); *H01M 8/04201* (2013.01); *B60K 2015/03118* (2013.01); *B60K 2015/03315* (2013.01); *B60K 2015/0634* (2013.01); *B60K 2015/0635* (2013.01); *B60K 2015/0638* (2013.01); *B60K 2015/0675* (2013.01); *B60Y 2306/01* (2013.01);

(Continued)

(58) Field of Classification Search
CPC .............. B60K 15/07; B60K 15/03006; B60L 11/1898; H01M 8/04201
USPC ........................................... 280/834
See application file for complete search history.

(56) References Cited

U.S. PATENT DOCUMENTS 3,479,043 A    11/1969  Piehl
4,319,728 A *  3/1982   Pataki ................... B60K 15/07
                                                        248/154

(Continued)

FOREIGN PATENT DOCUMENTS

CN    101678760 A    3/2010
CN    102388255 A    3/2012
(Continued)

*Primary Examiner* — Jacob D Knutson
(74) *Attorney, Agent, or Firm* — Finnegan, Henderson, Farabow, Garrett & Dunner, LLP

(57) ABSTRACT

A vehicle includes: a vehicle body; a gas tank having a tank main body that includes a cylindrical barrel part and a cap that is provided at one end of the tank main body in a longitudinal direction; a bracket fixing the cap to the vehicle body; and a band surrounding an outer circumferential surface of the barrel part and fixing the barrel part to the vehicle body, wherein the gas tank is arranged such that the longitudinal direction extends along a front-rear direction of the vehicle, the bracket includes an engaging part that restrict movement of the gas tank in the longitudinal direction by engaging with an engaged part provided in the cap, and movement of the gas tank in the longitudinal direction is restricted by the engaging part only at the one end, and not at the other end, of the gas tank in the longitudinal direction.

8 Claims, 27 Drawing Sheets

(51) Int. Cl.
  *B60L 11/18* (2006.01)
  *H01M 8/04082* (2016.01)
  *B60K 15/063* (2006.01)
  *H01M 8/1018* (2016.01)
  *B60K 15/067* (2006.01)
(52) U.S. Cl.
  CPC ............... *H01M 2008/1095* (2013.01); *H01M 2250/20* (2013.01)

(56) References Cited

U.S. PATENT DOCUMENTS

| | | | | |
|---|---|---|---|---|
| 6,053,533 | A * | 4/2000 | Osborn | B60K 15/067 |
| | | | | 280/830 |
| 6,378,823 | B1 * | 4/2002 | Edholm | B60K 15/067 |
| | | | | 180/68.5 |
| 8,056,928 | B2 * | 11/2011 | Ijaz | B60K 15/013 |
| | | | | 280/830 |
| 8,408,600 | B2 * | 4/2013 | Kondo | B60K 15/07 |
| | | | | 280/834 |
| 2003/0047932 | A1 * | 3/2003 | Kawazu | B60K 15/07 |
| | | | | 280/830 |
| 2006/0076001 | A1 * | 4/2006 | Haisley | F41B 11/724 |
| | | | | 124/75 |
| 2007/0170180 | A1 * | 7/2007 | Watanabe | B60K 15/03006 |
| | | | | 220/4.12 |
| 2009/0133948 | A1 | 5/2009 | Ijaz et al. | |
| 2010/0045018 | A1 * | 2/2010 | Kondo | B60K 15/07 |
| | | | | 280/834 |
| 2012/0024745 | A1 * | 2/2012 | Otsuka | B29C 53/602 |
| | | | | 206/524.3 |

FOREIGN PATENT DOCUMENTS

| | | | |
|---|---|---|---|
| DE | 10 2009 039 079 A1 | | 3/2011 |
| JP | 2001-317413 | | 11/2001 |
| JP | 2002-046484 A | | 2/2002 |
| JP | 2002046484 A | * | 2/2002 |
| JP | 2003-205754 | | 7/2003 |
| JP | 3602777 B2 | | 12/2004 |
| JP | 2005-170272 | | 6/2005 |
| JP | 2006-168527 | | 6/2006 |
| JP | 2006168527 A | * | 6/2006 |
| JP | 2009-184571 | | 8/2009 |
| JP | 2009-220680 | | 10/2009 |
| JP | 2016-88228 | | 5/2016 |
| JP | 2017-88015 A | | 5/2017 |
| KR | 10-2007-0069181 | | 7/2007 |

* cited by examiner

VEHICLE

INCORPORATION BY REFERENCE

The disclosure of Japanese Patent Application No. 2016-074221 filed on Apr. 1, 2016 including the specification, drawings and abstract is incorporated herein by reference in its entirety.

BACKGROUND

1. Field of the Disclosure

The present disclosure relates to a vehicle-related technique.

2. Description of Related Art

A vehicle is known in which a gas tank (cylinder) is arranged inside a center tunnel and a barrel part of the gas tank is fixed to a vehicle body by means of a cylinder support belt.

SUMMARY

Movement of the gas tank in a vehicle front-rear direction is restricted by frictional force acting between the cylinder support belt and the barrel part of the gas tank. Here, a large external force may be applied to the gas tank in the vehicle front-rear direction due to collision of the vehicle, rapid acceleration or deceleration of the vehicle, etc. In such an event, the gas tank may be displaced from an original mounting position in the vehicle. If the gas tank is displaced from the mounting position, the gas tank will hit other constituent members of the vehicle. The length of the gas tank in a longitudinal direction (tank length) can have various values according to the design specifications etc. Thus, there is a demand for a technique by which a gas tank can be fixed to a vehicle body regardless of the tank length.

One aspect of the present disclosure is a vehicle including: a vehicle body; a gas tank having a tank main body that includes a cylindrical barrel part and a cap that is provided at one end of the tank main body in a longitudinal direction; a bracket fixing the cap to the vehicle body; and a band surrounding an outer circumferential surface of the barrel part and fixing the barrel part to the vehicle body; wherein the gas tank is arranged such that the longitudinal direction extends along a front-rear direction of the vehicle, the bracket includes an engaging part that restrict movement of the gas tank in the longitudinal direction by engaging with an engaged part provided in the cap, and movement of the gas tank in the longitudinal direction is restricted by the engaging part only at the one end, and not at the other end, of the gas tank in the longitudinal direction. According to this aspect, movement of the gas tank in the longitudinal direction can be restricted by the bracket. As a result, the gas tank is less likely to be displaced from an original mounting position even when an external force is applied to the gas tank in the vehicle front-rear direction due to, for example, collision of the vehicle or rapid acceleration or deceleration of the vehicle. Here, as the engaging parts of the bracket engage with the engaged part of the cap, the position of the engaged part in the vehicle front-rear direction needs to match the position of the engaging parts of the bracket. By contrast, the band is a member that fixes the cylindrical barrel part to the vehicle body. Accordingly, the band can be used within an area where the barrel part is located in the vehicle front-rear direction to fix the barrel part to the vehicle body, which provides higher flexibility in fixing the gas tank to the vehicle body. In other words, it is possible to fix the gas tank to the vehicle body regardless of the tank length of the gas tank.

In the above aspect, the vehicle may further include a second gas tank that is located further on a front side or a rear side than the gas tank in the front-rear direction and arranged such that a longitudinal direction extends along a width direction of the vehicle, wherein, in the front-rear direction, the cap may be located on a side closer to the second gas tank than the other end of the gas tank in the longitudinal direction. The gas tank may expand and contract by being filled with a filling (e.g., hydrogen as a gas) or discharging a filling. According to this aspect, the bracket has the engaging parts that restrict movement of the gas tank in the longitudinal direction, and this bracket fixes the cap located on the side closer to the other gas tank to the vehicle body. As a result, the gas tank s less likely to collide with the other gas tank even when the length of the gas tank in the longitudinal direction changes as the gas tank expands or contracts.

In the above aspect, the vehicle body may include a floor panel forming a floor of a vehicle interior; the floor panel may include a center tunnel which extends in the front-rear direction and protrudes toward the vehicle interior and on an inside of which the gas tank is arranged; the center tunnel may include a first tunnel and a second tunnel that is connected to a rear end of the first tunnel in the front-rear direction and extends toward the rear side; the barrel part may be surrounded by the band at a position in the first tunnel in the front-rear direction; and, in a cross-section orthogonal to the front-rear direction, a cross-sectional area inside the first tunnel at a portion where the band is located may be larger than a cross-sectional area inside the second tunnel. According to this aspect, the portion of the first tunnel having a cross-sectional area larger than the cross-sectional area inside the second tunnel can be effectively used to arrange the band that surrounds the barrel part.

In the above aspect, the vehicle body may include a floor panel forming a floor of a vehicle interior; the floor panel may include a center tunnel which extends in the front-rear direction and protrudes toward the vehicle interior and on an inside of which the gas tank is arranged; the center tunnel may include a first tunnel and a second tunnel that is connected to a rear end of the first tunnel in the front-rear direction and extends toward the rear side; the band may include a band main body that are arranged so as to surround the barrel part in a circumferential direction, and a band main body fastening member that is located further on an upper side than the barrel part and fastens up the band main body; the barrel part may be surrounded by the band at a position in the first tunnel in the front-rear direction of the vehicle; and, in a cross-section orthogonal to the front-rear direction, a height of a cross-section inside the first tunnel at a portion where the band is located may be larger than a height of a cross-section inside the second tunnel. According to this aspect, in the cross-section orthogonal to the front-rear direction, the height of the cross-section inside the first tunnel at the portion where the band is located is larger than the height of the cross-section inside the second tunnel, so that a sufficient space for arranging the band main body fastening member can be secured.

In the above aspect, the cap may include a cap main body that is inserted into the tank main body and forms a communication hole to provide communication between an outside and an inside of the tank main body, and a valve that is mounted on the cap main body and opens and closes the communication hole; and the engaged part may be provided in one of the cap main body and the valve, and the engaging part of the bracket may engage with the engaged part provided in one of the cap main body and the valve. According to this aspect, movement of the gas tank in the longitudinal direction can be restricted as the engaging parts engage with the engaged part provided in one of the cap main body and the valve.

In the above aspect, the engaged part may include a first protrusion or a first recess, and the engaging part of the bracket may include a second recess engaging with the first protrusion or a second protrusion engaging with the first recess. According to this aspect, it is possible to engage the engaged part and the engaging parts with each other by adopting a simple configuration where the engaged part is a protrusion or a recess and the engaging parts are recesses or protrusions.

In the above aspect, the vehicle may further include a buffer member arranged between the first protrusion and the second recess or between the first recess and the second protrusion. According to this aspect, the engaged part and the engaging parts are less likely to be damaged by colliding with each other.

In the above aspect, the bracket may include a bracket main body that are arranged such that the bracket main body surrounds an outer circumferential surface of the cap, clamp the cap, and includes the engaging part, and a fastening member that fix the bracket main body to the vehicle body. According to this aspect, it is possible to restrict movement of the cap in the longitudinal direction by the bracket main bodies and fix the cap to the vehicle body by the fastening members.

In the above aspect, the hand may surround the barrel part at a portion that is located on a side opposite from a side where the cap is located across a center of the barrel part in the longitudinal direction of the gas tank. According to this aspect, the cap located on the one end side of the tank can be fixed to the vehicle body by the bracket, and a portion of the barrel part located on the side opposite from the side where the cap is located across the center of the barrel part can be surrounded and fixed to the vehicle body by the band. Thus, the gas tank is less likely to incline.

The present disclosure can be realized in various other forms than those described above. For example, the present disclosure can be realized not only in the form of a vehicle as described above but also in the form of a method of fixing a gas tank to a vehicle etc.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. Embodiment

Figure 1:
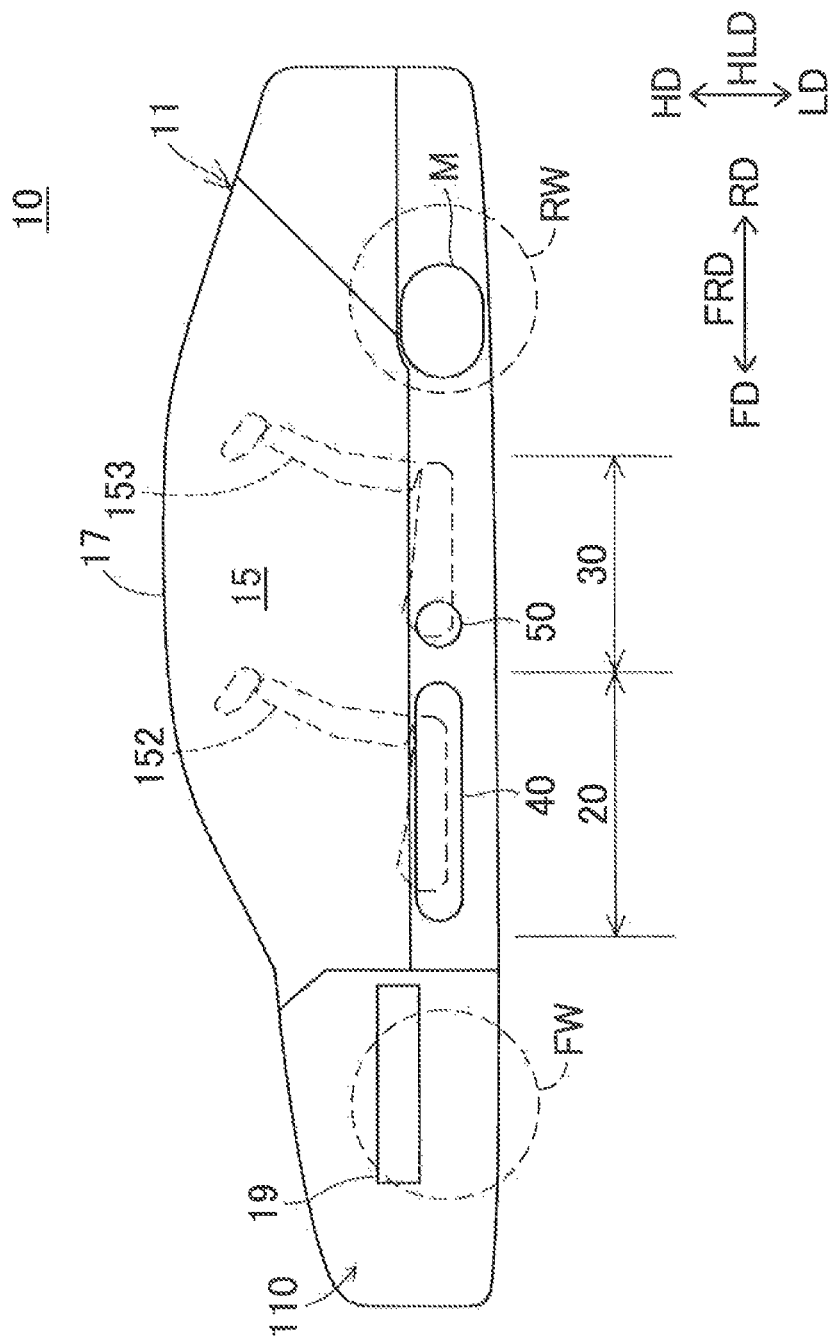
FIG. 1 is a sectional view showing a schematic configuration of a vehicle as one embodiment of the present disclosure.
Figure 2:
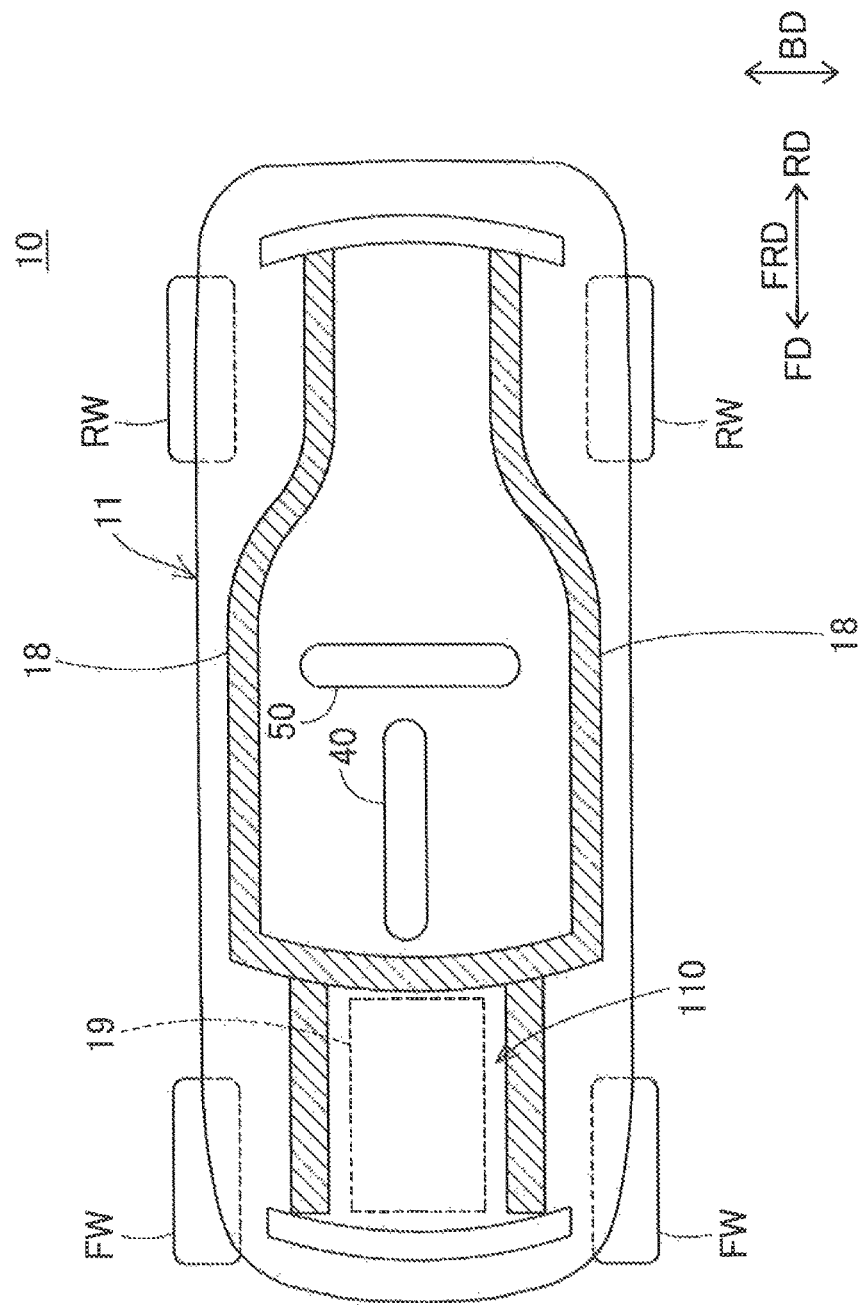
FIG. 2 is a schematic view showing the configuration of the vehicle.
Figure 3:
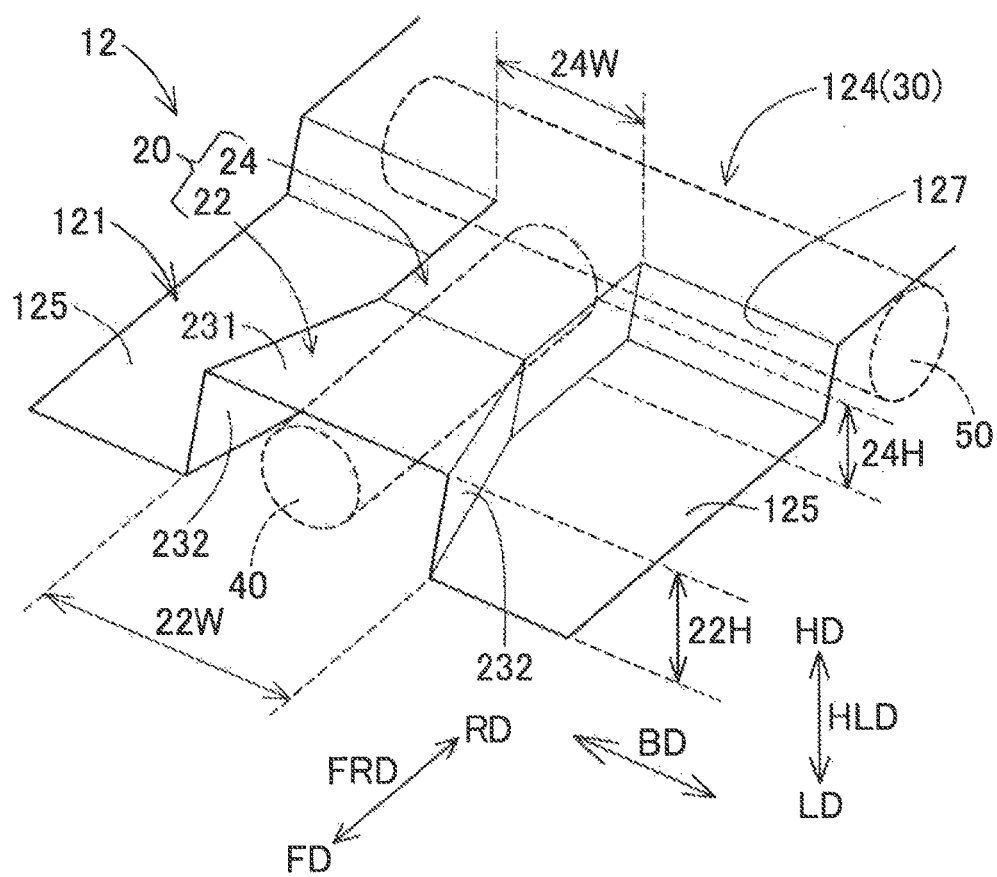
FIG. 3 is a schematic view of a floor panel.

FIG. 1 is a sectional view showing a schematic configuration of a vehicle 10 as one embodiment of the present disclosure. FIG. 2 is a schematic view showing the configuration of the vehicle 10. FIG. 3 is a schematic view of a floor panel 12. In FIG. 1, an arrow FRD indicating a front-rear direction of the vehicle 10 and an arrow HLD indicating a height direction of the vehicle 10 are shown. In FIG. 2, the arrow FRD and an arrow BD indicating a width direction of the vehicle 10 are shown. In FIG. 3, the arrow FRD, the arrow and the arrow BD are shown. In the subsequent drawings, too, the arrow FRD, the arrow HLD, and the arrow BD are shown as necessary. In the front-rear direction FRD, an arrow FD indicates a frontward direction of the vehicle 10 and an arrow RD indicates a rearward direction of the vehicle 10. In the height direction HLD, an arrow HD indicates an upward direction of the vehicle 10 and an arrow LD indicates a downward direction of the vehicle 10.

FIG. 1 shows a cross-section of the vehicle 10 at a center position in the width direction BD, along the frontward direction FD and the rearward direction RD of the vehicle 10. FIG. 2 is a view of the vehicle 10 as seen from the upward direction, and also shows part of the internal structure of the vehicle 10.

The vehicle 10 (FIG. 1, FIG. 2) includes a pair of front wheels FW, a pair of rear wheels RW, a motor M, a vehicle body 11, a frame 18, a fuel cell 19 as an electricity source, a first gas tank 40, and a second gas tank 50. The vehicle 10 is a fuel cell electric vehicle equipped with the fuel cell 19 as an electricity source. The vehicle 10 drives the rear wheels RW by driving the motor M with electricity generated by the fuel cell 19.

The vehicle body 11 forms a main body of the vehicle 10. The vehicle body 11 includes a roof panel 17 (FIG. 1) forming a ceiling of a vehicle interior 15, and a floor panel 12 (FIG. 3) forming a floor of the vehicle interior 15. In the vehicle interior 15, two front seats 152 (only one is shown in FIG. 1) and three rear seats 153 (only one is shown in FIG. 1) are arranged.

The frame 18 supports the vehicle body 11. The frame 18 is formed by a metal sheet. For example, the frame 18 is a side member. The floor panel 12 is mounted on the frame 18.

The fuel cell 19 is a polymer electrolyte fuel cell. The fuel cell 19 generates electricity by being supplied with hydrogen being a fuel gas and air being an oxidant gas. The fuel cell 19 is arranged in a front room 110 located on a front side of the vehicle 10. In this embodiment, the front room 110 is located further on the front side than the vehicle interior 15.

The first gas tank 40 and the second gas tank 50 are connected to the fuel cell 19 by pipes (not shown). The first gas tank 40 and the second gas tank 50 store hydrogen to be supplied to the fuel cell 19, under high pressure. The first gas tank 40 and the second gas tank 50 are arranged further on a lower side than the floor panel 12.

The floor panel 12 (FIG. 3) has a first floor panel 121 and a second floor panel 124 connected to the first floor panel 121. The first floor panel 121 is located further on the front side than the second floor panel 124.

The first floor panel 121 has two main bodies 125 which are located one on each side in the width direction BD and on which the front seats 152 are installed, and a center tunnel 20 located between the two main bodies 125 in the width direction BD. The main bodies 125 are substantially horizontal members.

The center tunnel 20 protrudes toward an upper side (side of the vehicle interior 15) from the main bodies 125. The center tunnel 20 is formed in a portion of the first floor panel 121 that is located in a center part of the vehicle 10 in the width direction BD. The center tunnel 20 extends in the front-rear direction FRD of the vehicle 10. The center tunnel 20 has two side parts 232 rising from the main bodies 125, and an upper part 231 connecting upper ends of the two side parts to each other and forming an upper surface of the center tunnel 20. The center tunnel 20 is open at a side opposite from the upper part 231 in the height direction HLD. The first gas tank 40 is arranged inside the center tunnel 20.

The center tunnel 20 has a first tunnel 22 and a second tunnel 24. A height 22H inside the first tunnel 22 decreases from the front side toward the rear side. A width 22W of the first tunnel 22 decreases from the front side toward the rear side. The second tunnel 24 is connected to a rear end of the first tunnel 22 and extends in the rearward direction RD. A height 24H and a width 24W inside the second tunnel 24 are constant. The height 22H of the first tunnel 22 is larger than the height 24H of the second tunnel 24. The width 22W of the first tunnel 22 is larger than the width 24W of the second tunnel 24.

As a step 127 is provided, the second floor panel 124 is located further on the upper side (side of the vehicle interior 15) than the main bodies 125 of the first floor panel 121. The second gas tank 50 is arranged under the second floor panel 124. A part where the second floor panel 124 forms an upper surface and the second gas tank 50 is arranged will be referred to also as a second gas tank arrangement part 30. The second floor panel 124 has a fixing wall (not shown) which extends from the upper surface toward the lower side and to which bands (to be described later) are fixed.

Figure 4:
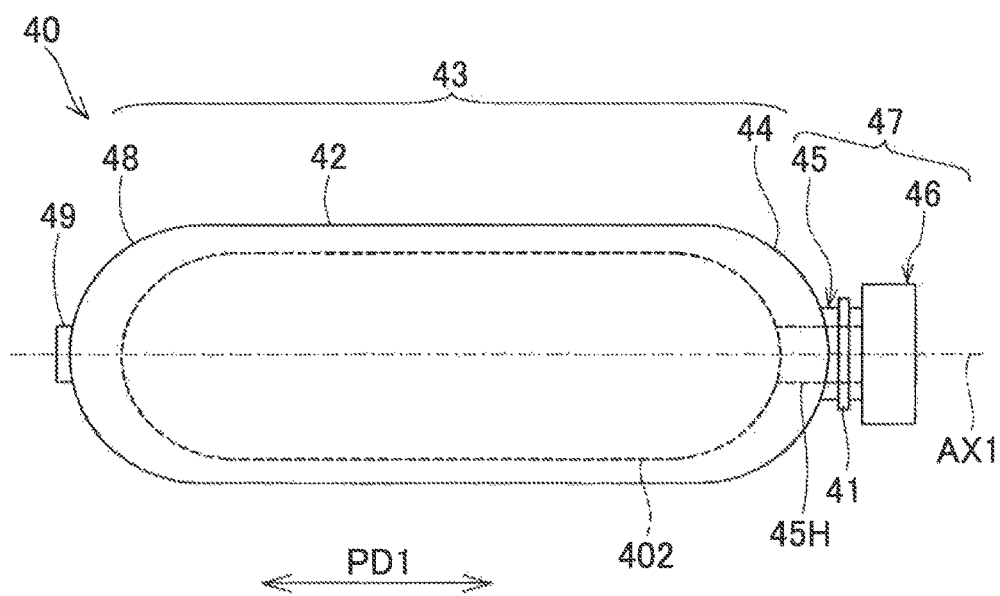
FIG. 4 is an external view of a first gas tank.

FIG. 4 is an external view of the first gas tank 40. FIG. 4 shows an axis AX1 of the first gas tank 40. The first gas tank 40 includes a tank main body 43, a first cap 47, and a second cap 49. A longitudinal direction PD1 of the first gas tank 40 is a left-right direction in the sheet of FIG. 4.

The tank main body 43 stores hydrogen serving as fuel of the vehicle 10 (particularly the fuel cell 19). The tank main body 43 includes a barrel part 42, a first dome 44, and a second dome 43.

The barrel part 42 is a cylindrical member extending in the longitudinal direction PD1. The first dome 44 is a hemispherical member connected to one end of the barrel part 42 in the longitudinal direction PD1. A diameter of the first dome 44 decreases in a direction away from the barrel part 42. The second dome 48 is a hemispherical member connected to the other end of the barrel part 42 in the longitudinal direction PD1. A diameter of the second dome 48 decreases in a direction away from the barrel part 42.

The first cap 47 is located at a top of the first dome 44. That is, the first cap 47 is located at one end of the first gas tank 40 in the longitudinal direction PD1. The first cap 47 has a cap main body 45 and a valve 46. The cap main body 45 is inserted into an opening formed at one end of the tank main body 43 and forms a communication hole 45H to provide communication between an outside and an inside 402 of the tank main body 43. The valve 46 is inserted into the cap main body 45 and mounted on the cap main body 45. The valve 46 opens and closes the communication hole 45H. A protrusion 41 as an engaged part extending along a circumferential direction is provided on an outer circumferential surface of a portion of the cap main body 45 that protrudes toward an outer side of the tank main body 43. The protrusion 41 protrudes from an outer circumferential surface of the cap main body 45.

The second cap 49 is located at a top of the second dome 48. That is, the second cap 49 is located at the other end of the first gas tank 40 in the longitudinal direction PD1. The second cap 49 is inserted into an opening formed at the other end of the tank main body 43. The second cap 49 has no communication hole that provides communication between the inside and the outside of the tank main body 43.

Figure 5:
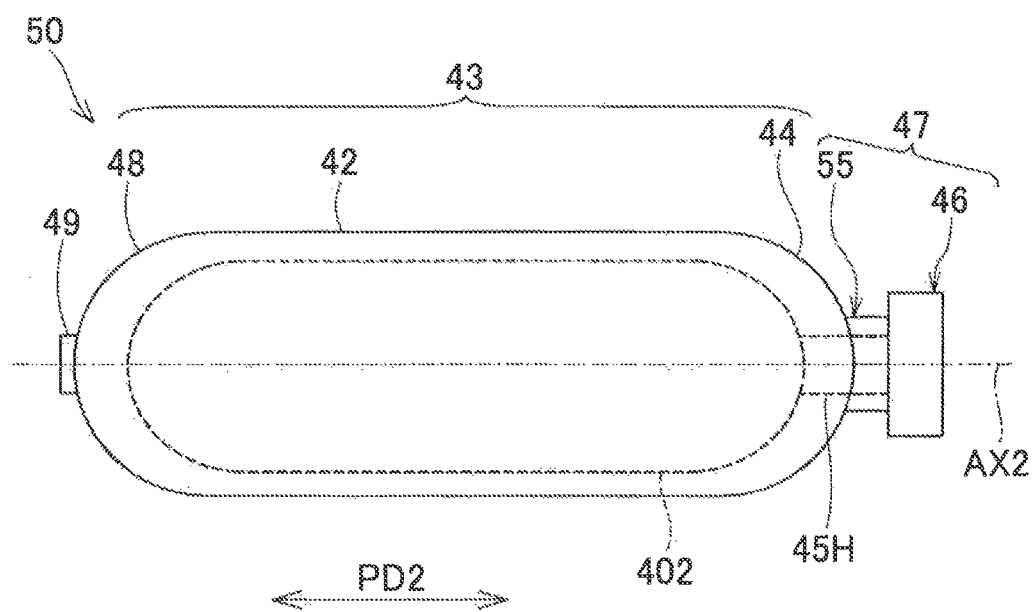
FIG. 5 is an external view of a second gas tank.

FIG. 5 is an external view of the second gas tank 50. In FIG. 5, an axis AX2 of the second gas tank 50 is shown. A difference between the second gas tank 50 and the first gas tank 40 (FIG. 4) is that the protrusion 41 is not formed on a cap main body 55 of the second gas tank 50. As the other components of the second gas tank 50 are the same as with the first gas tank 40, the same components will be denoted by the same reference signs while description thereof will be omitted. The cap main body 55 is inserted into an opening formed at one end of the tank main body 43 and forms a communication hole 45H to provide communication between the outside and the inside 402 of the tank main body 43. An arrow PD2 indicates a longitudinal direction of the second gas tank 50.

Figure 6:
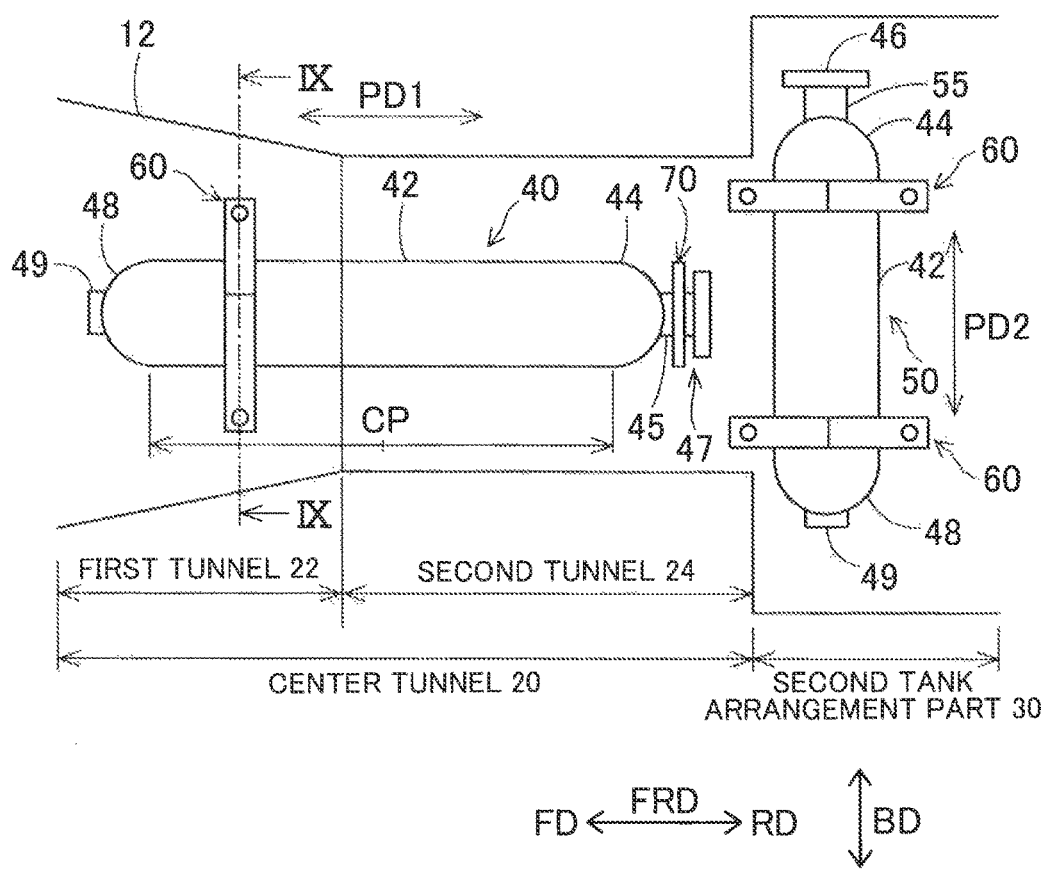
FIG. 6 is a view illustrating positions of arrangement of the first gas tank and the second gas tank.
Figure 7:
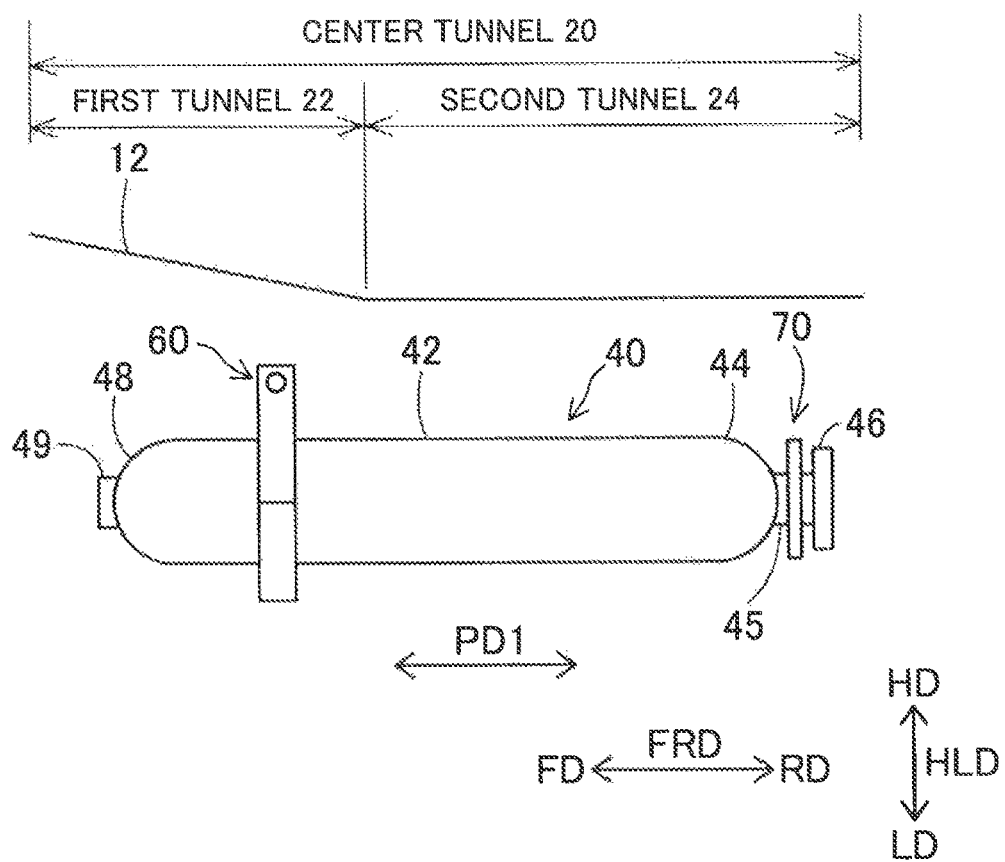
FIG. 7 is a view illustrating the position of arrangement of the first gas tank.

FIG. 6 is a view illustrating positions of arrangement of the first gas tank 40 and the second gas tank 50. FIG. 1 is a view illustrating the position of arrangement of the first gas tank 40. FIG. 6 is a schematic view of the vehicle 10 as seen from the lower side. FIG. 7 is a schematic sectional view of the center tunnel 20 with the first gas tank 40 arranged inside, as seen from the width direction BD of the vehicle 10.

As shown in FIG. 6 and FIG. 7, the first gas tank 40 is arranged inside the center tunnel 20 so that the longitudinal direction PD1 is parallel to the front-rear direction FRD of the vehicle 10. As shown in FIG. 6, the second gas tank 50 is arranged inside the second gas tank arrangement part 30 so that the longitudinal direction PD2 is parallel to the width direction BD of the vehicle 10. The second gas tank 50 is located further on the rear side than the first gas tank 40. In the height direction HLD of the vehicle 10, the first gas tank 40 and the second gas tank 50 are arranged at overlapping positions.

The first gas tank 40 is fixed by a bracket 70 and a band 60 to the floor panel 12 constituting a part of the vehicle body 11. The bracket 70 fixes to the floor panel 12 the first cap 47 that is provided at one end, closer to the second gas tank 50, of both ends of the first gas tank 40 in the longitudinal direction PD1.

The band 60 fixes the barrel part 42 to the floor panel 12 while holding and surrounding the barrel part 42. The band 60 surrounds the barrel part 42 at a portion that is located further on the side of the other end of the first gas tank 40 (left side in the sheet of FIG. 6) than a center CP of the barrel part 42 in the longitudinal direction PD1 of the first gas tank 40. In other words, the band 60 surrounds the barrel part 42 at a portion that is located on the side opposite from the side where the first cap 47 is located across the center CP in the longitudinal direction PD1. As shown in FIG. 6 and FIG. 7, in the front-rear direction FRD, the barrel part 42 is surrounded by the band 60 at a position in the first tunnel 22.

The second gas tank 50 (FIG. 6) is fixed by two bands 60 to the floor panel 12 constituting a part of the vehicle body 11. The two bands 60 are arranged on the barrel part 42 of the second gas tank 50 across a center in the longitudinal direction PD2.

Figure 8:
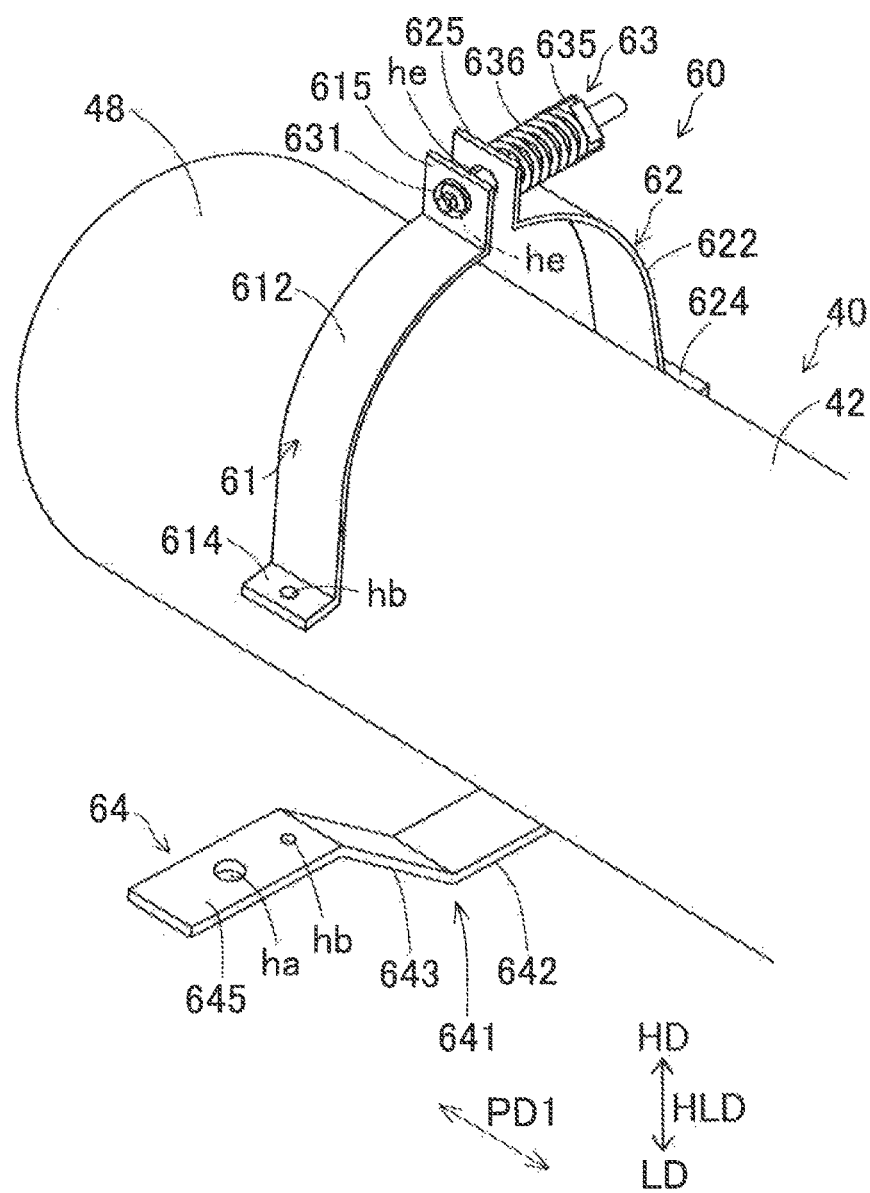
FIG. 8 is a view illustrating a band.
Figure 9:
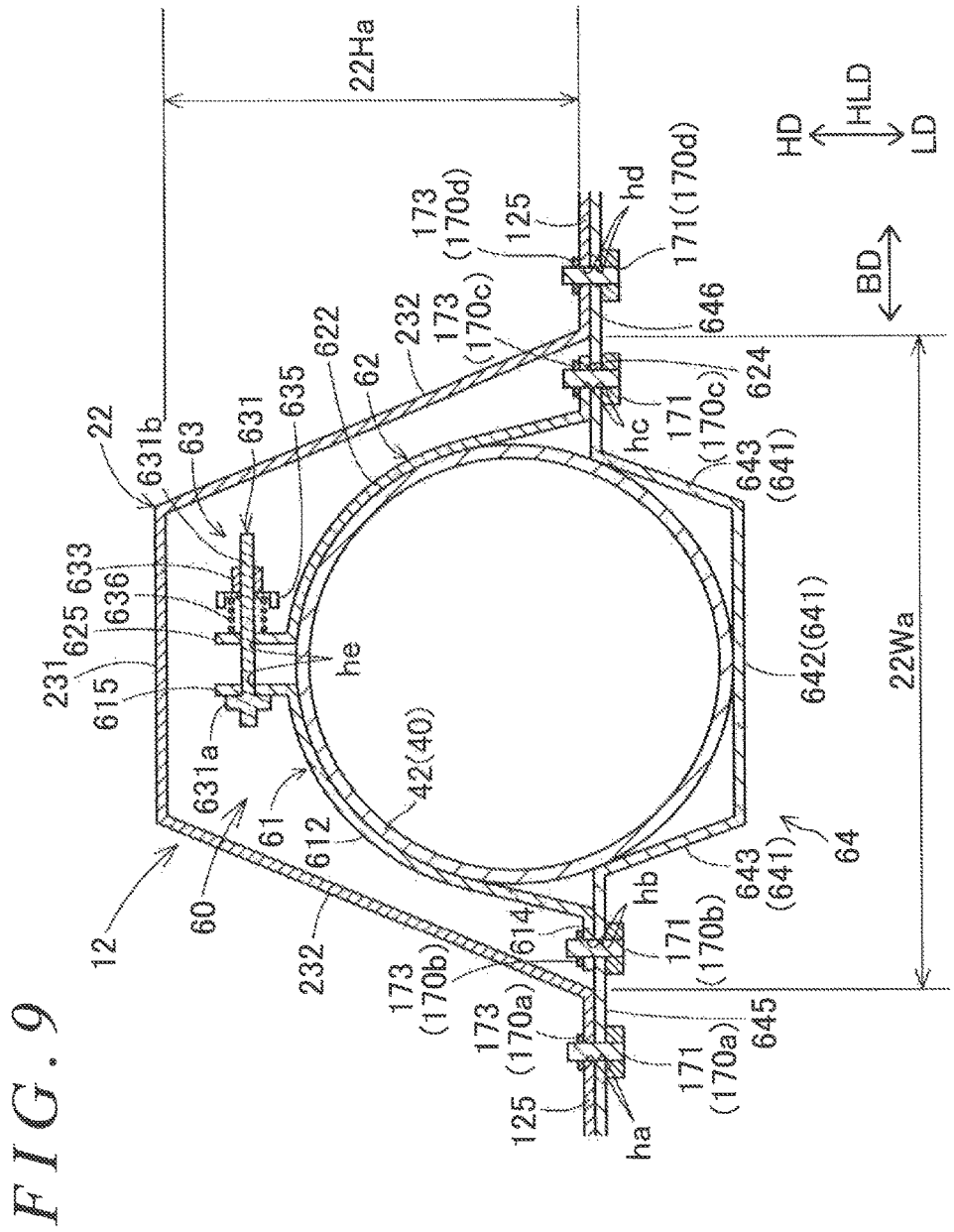
FIG. 9 is a sectional view taken along the line IX-IX of FIG. 6.

FIG. 8 is a view illustrating the band 60. FIG. 9 is a sectional view taken along the line 1X-1X of FIG. 6. The specific configuration of the band 60 will be described using FIG. 8 and FIG. 9.

The band 60 fixes the barrel part 42 to the floor panel 12 while surrounding and holding an outer circumferential surface of the barrel part 42. The band 60 (FIG. 8) includes a first upper band main body 61, a second upper hand main body 62, a lower band main body 64, a band main body fastening member 63, and first to fourth fastening members 170a to 170d (FIG. 9). As shown in FIG. 9, the first upper band main body 61, the second upper band main body 62, and the lower band main body 64 are arranged so as to surround the outer circumferential surface of the barrel part 42 and hold the barrel part 42. The first upper band main body 61 and the second upper band main body 62 are both located further on the upper side than the lower band main body 64. The first upper band main body 61 and the second upper band main body 62 surround an upper part of the barrel part 42, while the lower band main body 64 surrounds a lower part of the barrel part 42.

The first upper band main body 61, the second upper band main body 62, and the lower band main body 64 are made of metal such as steel. Alternatively, the first upper band main body 61, the second upper band main body 62, and the lower band main body 64 may be made of synthetic resin.

As shown in FIG. 9, the first to fourth fastening members 170a to 170d are each composed of a bolt 171 and a nut 173.

The first upper band main body 61 has a band main body part 612 that comes in contact with a part of the outer circumferential surface of the barrel part 42 along the circumferential direction, a first fastening portion 614 connected to one end of the band main body part 612, and a second fastening portion 615 connected to the other end of the hand main body part 612. The first fastening portion 614 has a through-hole hb through which the bolt 171 of the second fastening member 170h is inserted. The second fastening portion 615 has a through-hole he through which a bolt 631 of the band main body fastening member 63 is inserted.

The second upper band main body 62 has a band main body part 622 that comes in contact with another part of the outer circumferential surface of the barrel part 42 along the circumferential direction, a first fastening portion 624 connected to one end of the band main body part 622, and a second fastening portion 625 connected to the other end of the band main body part 622. The first fastening portion 624 has a through-hole he through which the bolt 171 of the third fastening member 170c is inserted. The second fastening portion 625 has a through-hole he through which the bolt 631 of the hand main body fastening member 63 is inserted. The through-hole he of the second fastening portion 615 and the through-hole he of the second fastening portion 625 face each other in the width direction BD of the vehicle 10.

The lower band main body 64 has a frame main body part 641 on which the lower part of the barrel part 42 is arranged, a first lower band fastening portion 645 connected to one end of the frame main body part 641, and a second lower band fastening portion 646 connected to the other end of the frame main body part 641. The frame main body part 641 has a frame bottom 642 that forms a bottom and extends in the width direction BD, and a pair of inclined portions 643 that are connected to both ends of the frame bottom 642 in the width direction BD and rise from both ends thereof. The frame bottom 642 and the inclined portions 643 are in contact with the lower part of the barrel part 42. Alternatively, a buffer member, such as a rubber member or a disc spring, may be arranged between the barrel part 42 and the frame bottom 642 and the inclined portions 643 of the frame main body part 641.

In the height direction HLD, the first lower band fastening portion 645 faces the first fastening portion 614 of the first upper band main body 61. The first lower band fastening portion 645 has a through-hole ha through which the bolt 171 of the first fastening member 170a is inserted and a through-hole hb through which the bolt 171 of the second fastening member 170b is inserted. In the height direction HLD, the second lower band fastening portion 646 faces the first fastening portion 624 of the second upper band main body 62. The second lower band fastening portion 646 has a through-hole he through which the bolt 171 of the third fastening member 170c is inserted and a through-hole hd through which the bolt 171 of the fourth fastening member 170d is inserted.

As shown in FIG. 9, the first fastening portion 614 of the first upper band main body 61 and the first lower band fastening portion 645 of the lower band main body 64 are fixed together by the second fastening member 170b (bolt 171 and nut 173). The first fastening portion 624 of the second upper band main body 62 and the second lower band fastening portion 646 of the lower band main body 64 are fixed together by the third fastening member 170c (bolt 171 and nut 173). The first lower band fastening portion 645 of the lower hand main body 64 and the main body 125 of the floor panel 12 are fixed together by the first fastening member 170*a* (bolt 171 and nut 173). The second lower band fastening portion 646 of the lower band main body 64 and the main body 125 of the floor panel 12 are fixed together by the fourth fastening member 170*d* (bolt 171 and nut 173).

The band main body fastening member 63 (FIG. 8) fastens up the first upper band main body 61 and the second upper band main body 62 by fixing together the second fastening portion 615 of the first upper band main body 61 and the second fastening portion 625 of the second upper band main body 62. The band main body fastening member 63 is located further on the upper side than the barrel part 42. The band main body fastening member 63 has a coil spring 636, a coil spring bearing 635, the bolt 631, and a nut 633 (FIG. 9).

The coil spring 636 is arranged in a compressed state, and generates an urging force for fastening together the second fastening portion 615 of the first upper band main body 61 and the second fastening portion 625 of the second upper band main body 62. One end of the coil spring 636 is butted against the coil spring bearing 635, and the other end of the coil spring 636 is butted against the second fastening portion 625 of the second upper band main body 62. A shank 631*b* of the bolt 631 is inserted through the second fastening portion 615 of the first upper band main body 61, the second fastening portion 625 of the second upper band main body 62, and the coil spring bearing 635. A head 631*a* of the bolt 631 is butted against the second fastening portion 615 of the first upper band main body 61. The nut 633 is fastened on the shank 631*b* of the bolt 631 in a direction in which the coil spring 636 is compressed through the coil spring bearing 635. Thus, the second fastening portion 615 of the first upper band main body 61 and the second fastening portion 625 of the second upper band main body 62 come closer to each other, reducing a region in which the barrel part 42 is surrounded by the first upper band main body 61, the second upper band main body 62, and the lower band main body 64. As the region surrounding the barrel part 42 is thus reduced, the barrel part 42 is fastened and held by the first upper band main body 61 the second upper band main body 62, and the lower band main body 64. The band 60 restricts movement of the first gas tank 40 in the longitudinal direction PD1 by a frictional force.

Here, a diameter of the barrel part 42 increases or decreases as an internal pressure of the tank main body 43 changes. The degree of compression of the coil spring 636 changes according to such changes in diameter of the barrel part 42, causing an interval between the second fastening portion 615 of the first upper band main body 61 and the second fastening portion 625 of the second upper band main body 62 to be changed accordingly. Thus, a fastening force exerted by the band 60 on the barrel part 42 can be maintained to be substantially constant.

As shown in FIG. 9, a height 22Ha inside the first tunnel 22 at a portion where the band 60 is located is larger than the height 24H (FIG. 3) inside the second tunnel 24. A width 22Wa inside the first tunnel 22 at a portion where the band 60 is located is larger than the width 24W (FIG. 3) of the second tunnel 24. In a cross-section orthogonal to the front-rear direction FRD, a cross-sectional area inside the first tunnel 22 at a rectangular portion where the band 60 is located is larger than a cross-sectional area inside the second tunnel 24 (at a rectangular portion). Here, the cross-sectional area inside the first tunnel 22 is an area of a closed region formed by connecting lower ends of the two side parts 232 by a straight line. Likewise, the cross-sectional area inside the second tunnel 24 is an area of a closed region.

Figure 10:
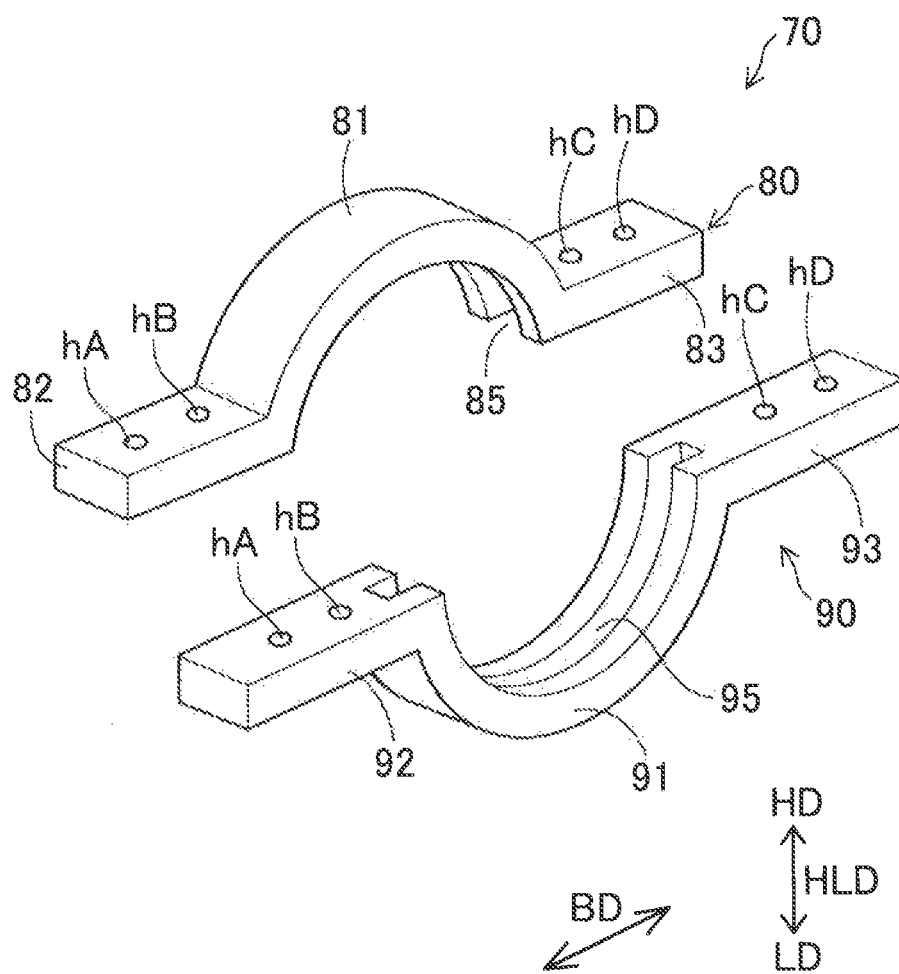
FIG. 10 is a perspective view of a bracket.
Figure 11:
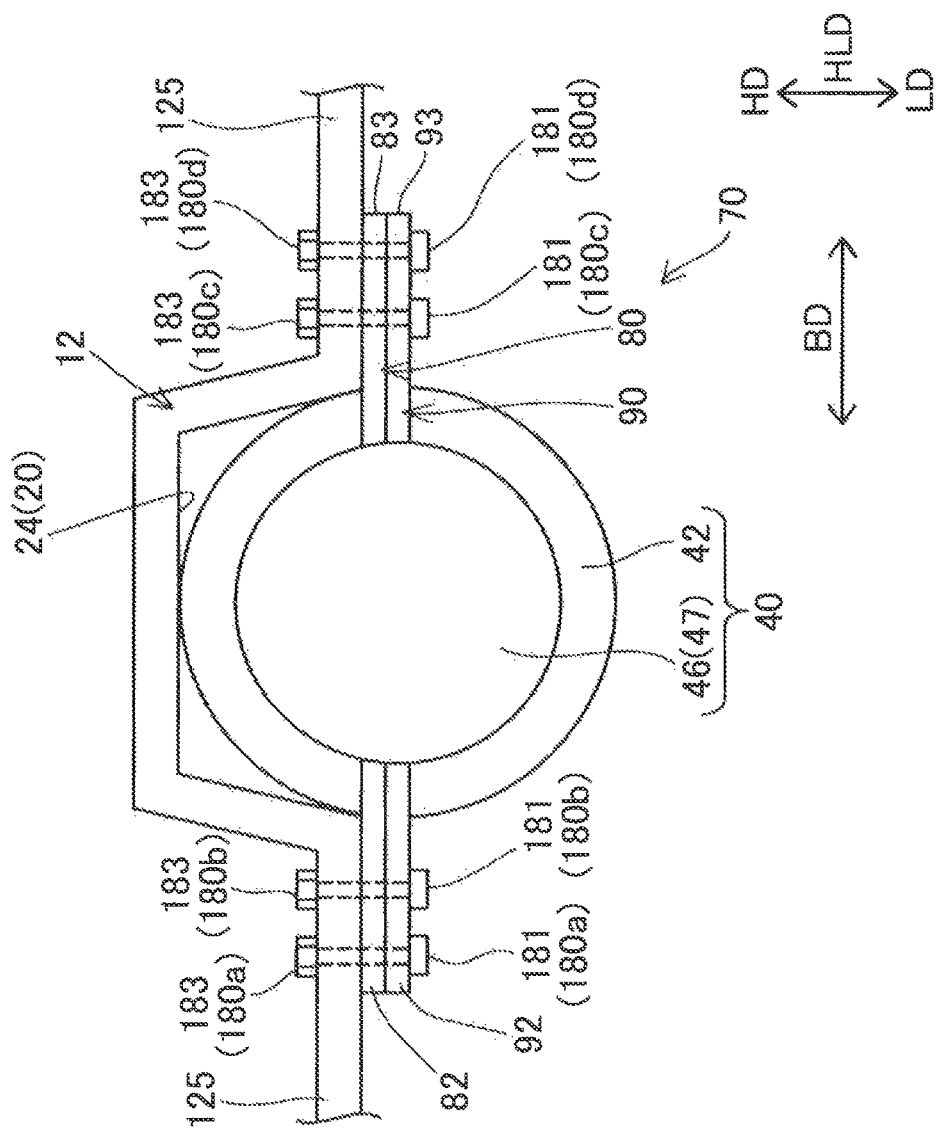
FIG. 11 is a view of the first gas tank fixed to the floor panel, as seen from a rear side.

FIG. 10 is a perspective view of the bracket 70. FIG. 11 is a view of the first gas tank 40 fixed to the floor panel 12, as seen from the rear side.

The bracket 70 (FIG. 11) fixes the first cap 47 of the first gas tank 40 to the floor panel 12 while surrounding the first cap 47 at a position in the second tunnel 24 in the front-rear direction of the vehicle 10. The bracket 70 has a first bracket main body 80, a second bracket main body 90, and first to fourth fastening members 180*a* to 180*d*. The first to fourth fastening members 180*a* to 180*d* are each composed of a bolt 181 and a nut 183.

The first bracket main body 80 and the second bracket main body 90 are made of metal such as steel. Alternatively, the first bracket main body 80 and the second bracket main body 90 may be made of synthetic resin. The cap main body 45 (FIG. 4) is held as the first bracket main body 80 presses the cap main body 45 from the upper side and the second bracket main body 90 presses the cap main body 45 from the lower side. That is, the first bracket main body 80 and the second bracket main body 90 are arranged so as to surround the outer circumferential surface of the cap main body 45, and clamp and hold the cap main body 45.

The first bracket main body 80 (FIG. 10) includes a curved part 81, a base end 82, and a leading end 83. The curved part 81 is curved along the outer circumferential surface of the cap main body 45. The base end 82 extends in a direction away from the first gas tank 40 from one end of the curved part 81 along a curving direction. The base end 82 is fixed to the main body 125 of the floor panel 12. The leading end 83 extends in a direction away from the first gas tank 40 from the other end of the curved part 81 along the curving direction. As with the first bracket main body 80, the second bracket main body 90 includes a curved part 91, a base end 92, and a leading end 93.

Recesses 85, 95 as engaging parts are respectively formed in inner circumferential surfaces of the curved parts 81, 91. The recess 85 is recessed from the inner circumferential surface of the curved part 81. The recess 95 is recessed from the inner circumferential surface of the curved part 91. The recess 85 is formed along a circumferential direction of the curved part 81. The recess 95 is formed along a circumferential direction of the curved part 91. The recesses 85, 95 are fitted and engaged with the protrusion 41 of the cap main body 45 to restrict movement of the first gas tank 40 in the longitudinal direction PD1. Engagement between the recesses 85, 95 and the protrusion 41 will be described in detail later.

The base ends 82, 92 have through-holes hA, hB through which bolts 181 of the first and second fastening members 180*a*, 180*h* are respectively inserted. The through-holes hA, hb penetrate the base ends 82, 92 in a thickness direction. The leading ends 83, 93 have through-holes hC, hD through which the bolts 181 of the third and fourth fastening members 180*c*, 180*d* are respectively inserted. The through-holes hC, hD penetrate the leading ends 83, 93 in the thickness direction. In a state of overlapping in the height direction HLD, the base ends 82, 92 (FIG. 11) are fixed to the main body 125 by the bolts 181 and the nuts 183 of the first and second fastening members 180*a*, 180*b*. In a state of overlapping in the height direction HLD, the leading ends 83, 93 are fixed to the main body 125 by the bolts 181 and the nuts 183 of the third and fourth fastening members 180*b*, 180*d*. The thickness direction of the base ends 82, 92 and the leading ends 83, 93 is the same as the height direction HLD of the vehicle 10.

Figure 12:
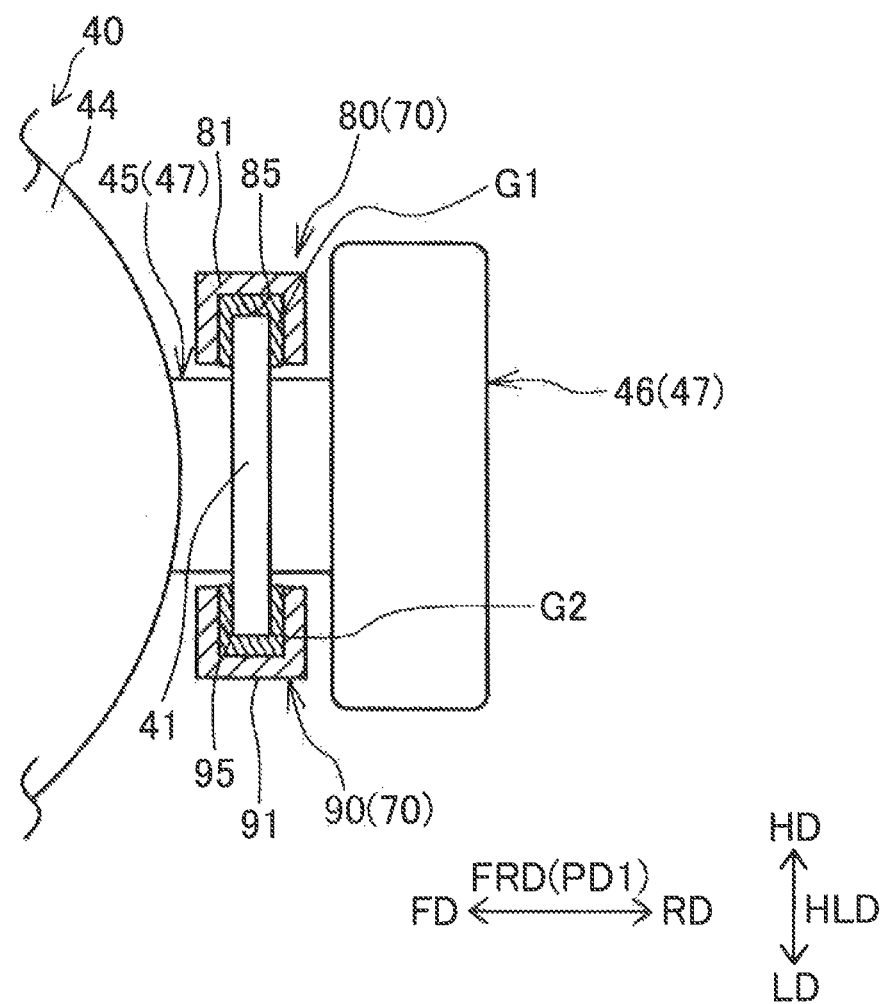
FIG. 12 is a view illustrating engagement between a cap main body and first and second bracket main bodies.

FIG. 12 is a view illustrating engagement between the cap main body 45 and the first and second bracket main bodies 80, 90. In FIG. 12, the first and second bracket main bodies 80, 90 are shown in cross-section. In FIG. 12, the rubber members G1, G2 are also shown in cross-section. The rubber member G1 as a buffer member is arranged between the protrusion 41 of the cap main body 45 and the recess 85 of the first bracket main body 80, and the rubber member G2 as a buffer member is arranged between the protrusion 41 of the cap main body 45 and the recess 95 of the second bracket main body 90. The protrusion 41 and the recess 85 are fitted and engaged with each other through the rubber member G1. The protrusion 41 and the recess 95 are fitted and engaged with each other through the rubber member G2. As the protrusion 41 and the recesses 85, 95 are thus fitted and engaged with each other, movement of the first gas tank 40 in the longitudinal direction PD1 relative to the floor panel 12 is restricted.

The rubber member G1 is interposed between inner surfaces on opposite sides and an inner bottom surface of the recess 85 and both side surfaces and a top surface of the protrusion 41. The same is true for the rubber member G2. Before being squeezed between the protrusion 41 and the recess 85, the rubber member has a thin plate shape extending in one direction. By being squeezed between the protrusion 41 and the recess 85, the rubber member G1 deforms elastically so as to match the shape of a clearance formed by the protrusion 41 and the recess 85. The same is true for the rubber member G2, the protrusion 41, and the recess 95. However, the shapes of the rubber members G1, G2 are not limited to this example, and, for example, the rubber members G1, G2 may have a recessed groove formed on one side so as to match the protrusion 41.

As the rubber members G1, G2 are provided, any impact, vibration, etc. acting on the first gas tank 40 can be absorbed by the rubber members G1, G2 deforming elastically. Moreover, as the rubber members G1, G2 are provided, the protrusion 41 and the recesses 85, 95 are less likely to be damaged by colliding with each other.

The shapes of the rubber members G1, G2 are not limited to a plate shape. For example, the rubber members G1, G2 may be molded articles with a shape following the outer circumferential surface of the protrusion 41. The molded article may be composed of two semicircular members, or may be formed as a ring-shaped integral molded article. If the rubber members G1, G2 are molded articles with a shape following the outer circumferential surface of the protrusion 41, the rubber members G1, G2 can be easily replaced, for example, when the rubber members G1, G2 have worn. Here, working noise or flow noise of the valve 46 may transmit as vibration via the bracket 70 to a component of the vehicle body, such as the floor panel 12, resonating inside the vehicle interior 15. If the rubber members G1, G2 are molded articles with a shape following the outer circumferential surface of the protrusion 41, compared with if the rubber members G1, G2 are plate-like members, the shapes of the rubber members G1, G2 after installation in the vehicle 10 can be prevented from changing significantly from the shapes before installation. Thus, properties of the rubber members G1, G2 can be accurately exploited. Specifically, the rubber members G1, G2 that can exert a sufficient damping effect can be installed in the vehicle 10.

Alternatively, the rubber hardness and the shape may be optimized so that the rubber members G1, G2 can exert the damping effect. For example, in the case of a vehicle 10 having high vibration transmissibility, the rubber hardness should be designed to be low within such a range that the cap main body 45 can be held by the bracket 70. The lower the rubber hardness, the higher the damping effect to be exerted. Moreover, in the case of a vehicle 10 with high vibration transmissibility, the rubber members G1, G2 may be arranged only in part of a space between the recesses 85, 95 and the protrusion 41, instead of the rubber members G1, G2 filling the entire space. Thus, a clearance is left between the recesses 85, 95 and the protrusion 41 where the rubber members G1, G2 are not arranged. Accordingly, a high damping effect can be exerted.

Of the rubber members G1, G2, portions in contact with the protrusion 41 or portions in contact with the recesses 85, 95 may be vulcanized. Thus, the degree of adhesion between the rubber members G1, G2 and the protrusion 41 or the degree of adhesion between the rubber members G1, G2 and the recesses 85, 95 is increased, so that the rubber members G1, G2 can be installed more effectively.

According to the above embodiment, the bracket 70 has the recess 85 (FIG. 12) that is fitted and engaged with the protrusion 41 of the first cap 47 to restrict movement of the first gas tank 40 in the longitudinal direction PD1. Thus, it is less likely that the first gas tank 40 is displaced from an original mounting position even when an external force is applied to the first gas tank 40 in the front-rear direction FRD of the vehicle 10 due to, for example, collision of the vehicle 10 or acceleration or deceleration of the vehicle 10. Moreover, the protrusion 41 and the recess 85 can be engaged with each other in the simple configuration of the protrusion 41 and the recess 85. Here, as the recesses 85, 95 of the bracket 70 engage with the protrusion 41 of the first cap 47 of the first gas tank 40, the positions of the recesses 85, 95 in the front-rear direction FRD of the vehicle 10 need to match the position of the protrusion 41 of the bracket 70. By contrast, the band 60 is a member that fixes the barrel part 42 to the vehicle body 11 (FIG. 8). Thus, the band 60 can be used within an area where the barrel part 42 is located in the front-rear direction FRD of the vehicle 10 to fix the barrel part 42 to the vehicle body 11, which provides higher flexibility in fixing the first gas tank 40 to the vehicle body 11. In other words, it is possible to fix the first gas tank 40 to the vehicle body 11 regardless of the tank length, so that first gas tanks 40 having various values of the tank length can be fixed to the vehicle body 11.

The first gas tank 40 may expand or contract by being filled with hydrogen or discharging hydrogen. According to the above embodiment, the bracket 70 has the recesses 85, 95 that restrict movement of the first gas tank 40 in the longitudinal direction PD1, and the bracket 70 fixes the first cap 47 located closer to the second gas tank 50 to the vehicle body 11 (FIG. 6). Thus, even when the length of the first gas tank 40 in the longitudinal direction PD1 changes as the first gas tank 40 expands or contracts, movement of the first cap 47 in the longitudinal direction PD1 can be restricted. Accordingly, the first gas tank 40 is less likely to collide with the second gas tank 50.

According to the above embodiment, in the cross-section orthogonal to the front-rear direction FRD, the cross-sectional area inside the first tunnel 22 at the portion where the band 60 is located is larger than the cross-sectional area inside the second tunnel 24 (FIG. 6, FIG. 7, FIG. 9). Thus, the portion of the first tunnel 22 having a cross-sectional area larger than the cross-sectional area inside the second tunnel 24 can be effectively used to arrange the band 60 that surrounds the barrel part 42. In the cross-section orthogonal to the front-rear direction FRD, the height 22Ha of the cross-section inside the first tunnel 22 at the portion where the hand 60 is located is larger than the height 24H of the cross-section inside the second tunnel 24 (FIG. 3, FIG. 9). Thus, a sufficient space can be secured for arranging the band main body fastening member 63 that is located further on the upper side than the barrel part 42.

According to the above embodiment, the bracket 70 fixes the first cap 47 located on the one end side of the first gas tank 40 to the floor panel 12, and the band 60 fixes the barrel part 42 to the floor panel 12 while surrounding a portion of the barrel part 42 that is located on the side opposite from the side where the first cap 47 is located across the center CP (FIG. 6). Thus, the first gas tank 40 is less likely to incline in the height direction HLD.

The first gas tank 40, the first cap 47, and the second gas tank 50 in the above embodiment correspond respectively to the gas tank, the cap, and the other gas tank described above. The first upper band main body 61, the second upper band main body 62, and the lower band main body 64 correspond to the band main bodies described in above.

B. Modified Aspects of Engaging Parts of Bracket 70 and Engaged Part of Cap Main Body In the above embodiment, the bracket 70 has the recesses 85, 95 as engaging parts, while the cap main body 45 has the protrusion 41 as an engaged part (FIG. 12). However, the engaging parts and the engaged part are not limited to those of the above embodiment, and may have any aspect in which the engaging parts and the engaged part can restrict movement of the first gas tank 40 in the longitudinal direction PD1 by engaging with each other. Modified aspects of the engaging parts of the bracket 70 and the engaged part of the cap main body 45 will be described below.

B-1. First Modified Aspect of Engaging Parts and Engaged Part

Figure 13:
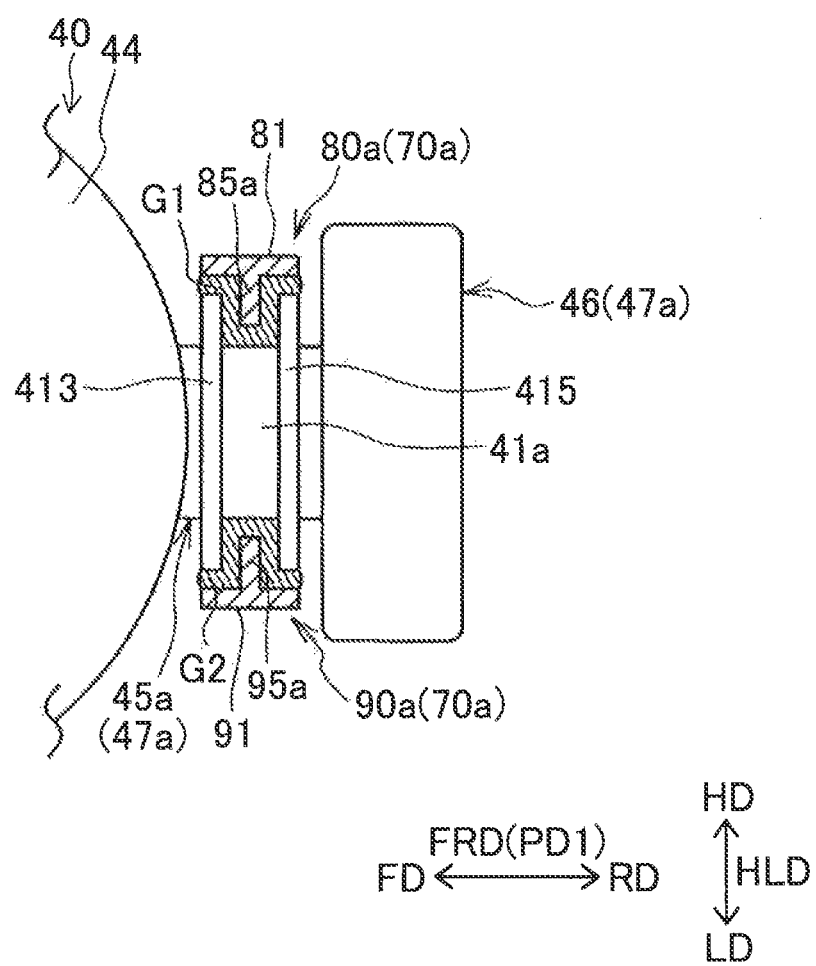
FIG. 13 is a schematic view illustrating a first modified aspect of engaging parts and an engaged part.

FIG. 13 is a schematic view illustrating a first modified aspect of the engaging parts and the engaged part. FIG. 13 corresponds to FIG. 12. The same components as in the above embodiment will be denoted by the same reference signs while description thereof will be omitted.

A cap main body 45a of a first cap 47a has protrusions 413, 415 extending along a circumferential direction of the cap main body 45a. The protrusions 413, 415 are provided at an interval in the longitudinal direction PD1, and a recess 41a as an engaged part is formed between the protrusions 413, 415. A protrusion 85a as an engaging part protruding toward the cap main body 45a is formed on the curved part 81 of a first bracket main body 80a of a bracket 70a. Similarly, a protrusion 95a as an engaging part is formed on the curved part 91 of a second bracket main body 90a. The recess 41a matches the shapes of the protrusions 85a, 95a. The recess 41a and the protrusions 85a, 95a are fitted and engaged with each other through the rubber members G1, G2. Movement of the first gas tank 40 in the longitudinal direction PD1 can be restricted by the recess 41a and the protrusions 85a, 95a.

B-2. Second Modified Aspect of Engaging Parts and Engaged Part

Figure 14:
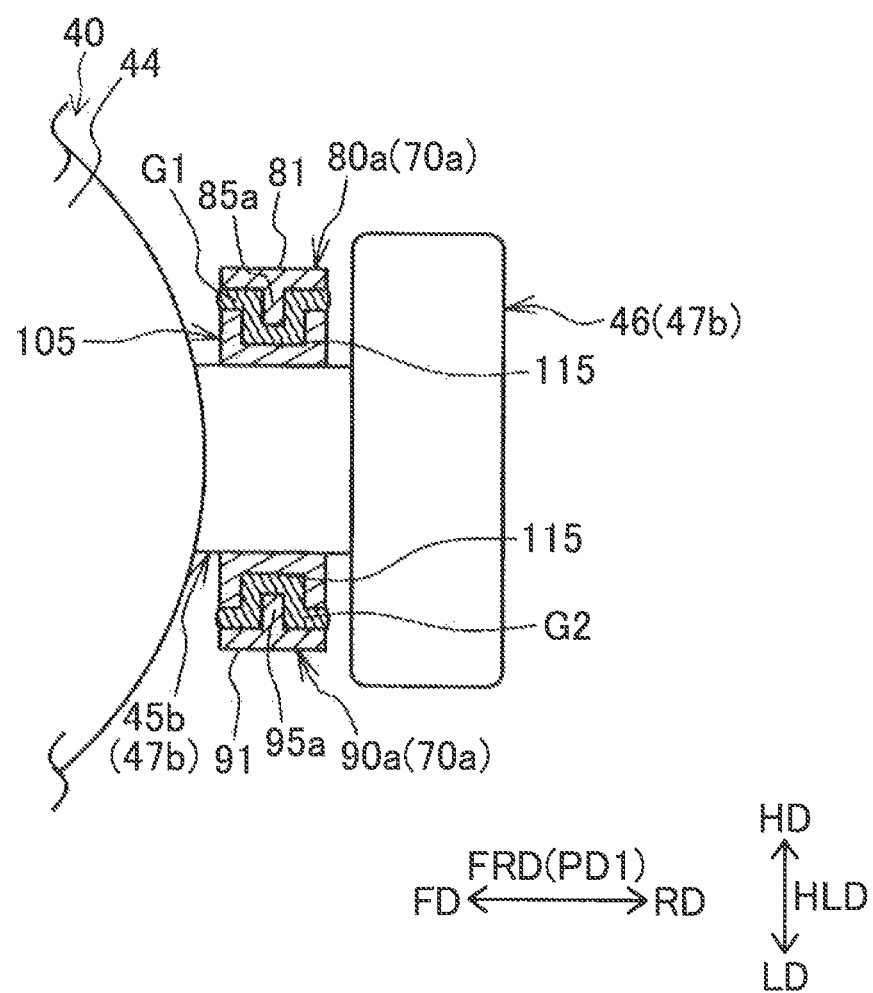
FIG. 14 is a schematic view illustrating a second modified aspect of the engaging parts and the engaged part.

FIG. 14 is a schematic view illustrating a second modified aspect of the engaging parts and the engaged part. FIG. 14 corresponds to FIG. 12. The same components as in the above embodiment and modified aspect will be denoted by the same reference signs while description thereof will be omitted.

A first cap 47b has an annular ring member 105 fixed on an outer circumferential surface of a cap main body 45b. The ring member 105 is formed separately from the cap main body 45b. A recess 115 as an engaged part extending along a circumferential direction is formed in an outer circumferential surface of the ring member 105. The recess 115 matches the shapes of the protrusions 85a, 95a as engaging parts. The recess 115 and the protrusions 85a, 95a are fitted and engaged with each other through the rubber members G1, G2. Movement of the first gas tank 40 in the longitudinal direction PD1 can be restricted by the recess 115 and the protrusions 85a, 95a.

B-3. Third Modified Aspect of Engaging Parts and Engaged Part

Figure 15:
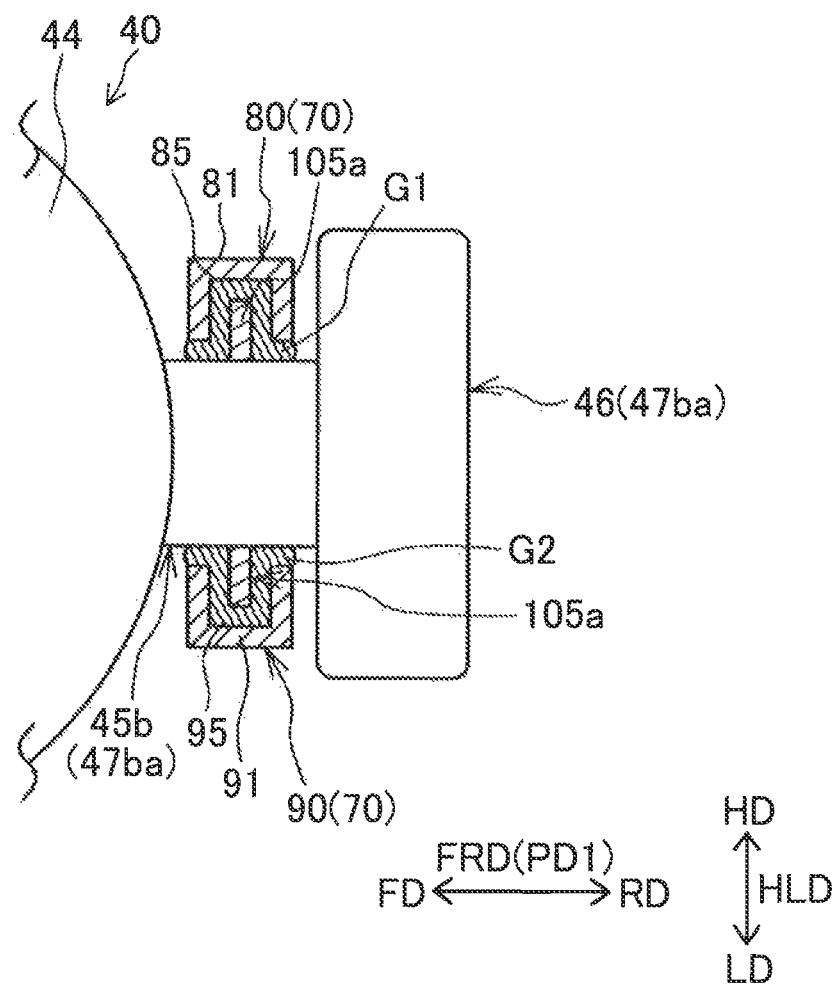
FIG. 15 is a schematic view illustrating a third modified aspect of the engaging parts and the engaged part.

FIG. 15 is a schematic view illustrating a third modified aspect of the engaging parts and the engaged part. FIG. 15 corresponds to FIG. 12. The same components as in the above embodiment and modified aspects will be denoted by the same reference signs while description thereof will be omitted.

A first cap 47ba has an annular ring member 105a fixed to the outer circumferential surface of the cap main body 45b. Thus, the ring member 105a as an engaged part can be regarded as a protrusion protruding from the outer circumferential surface of the cap main body 45b. The ring member 105a matches the shapes of the recesses 85, 95. The ring member 105a and the recesses 85, 95 are fitted and engaged with each other through the rubber members G1, G2. Movement of the first gas tank 40 in the longitudinal direction PD1 can be restricted by the ring member 105a and the recesses 85, 95.

It is not absolutely necessary to integrally form each of the ring members 105, 105a (FIG. 14, FIG. 15). For example, two semicircular members may be combined to form a ring-shaped member. The two semicircular members are tucked down by the first bracket main body 80 and the second bracket main body 90 to fix the position of the ring-shaped member. If the ring members 105, 105a are thus formed by two semicircular members, the ring members 105, 105a can be mounted on or dismounted from the cap main body 45b with the valve 46 mounted on the cap main body 45b.

B-4. Fourth Modified. Aspect of Engaging Parts and Engaged Part

Figure 16:
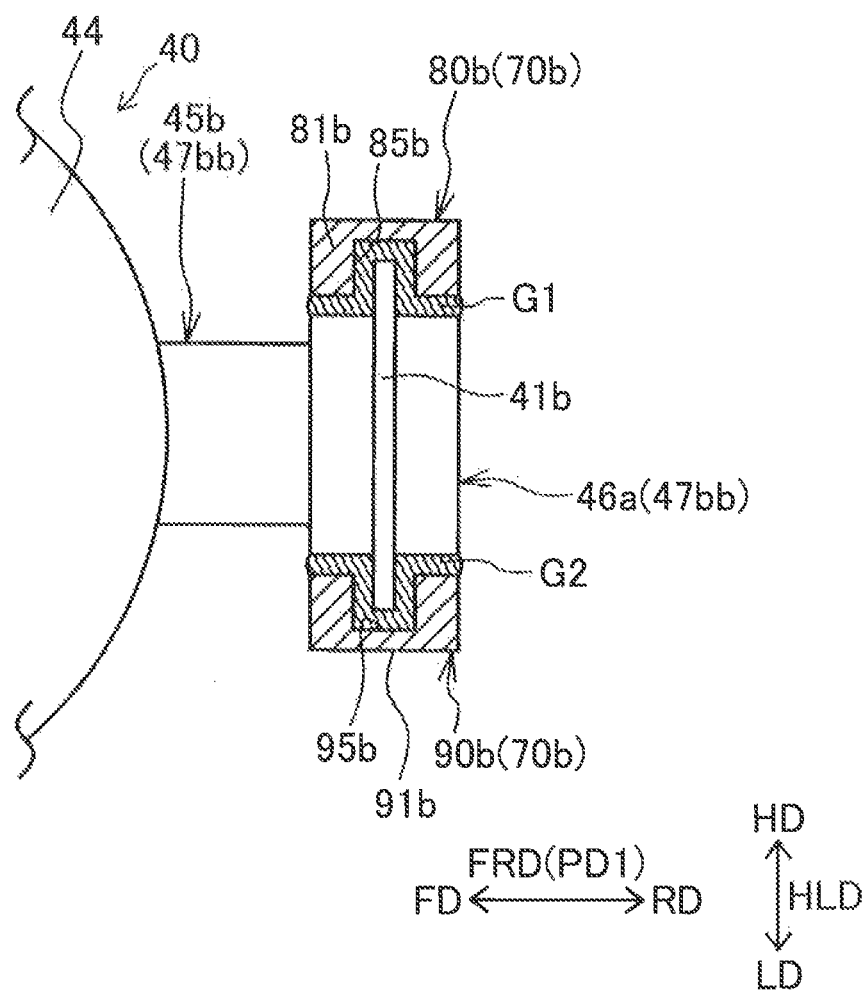
FIG. 16 is a schematic view illustrating a fourth modified aspect of the engaging parts and the engaged part.

FIG. 16 is a schematic view illustrating a fourth modified aspect of the engaging parts and the engaged part. FIG. 16 corresponds to FIG. 12. The same components as in the above embodiment and modified aspects will be denoted by the same reference signs while description thereof will be omitted. In the fourth modified aspect, a protrusion 41b as an engaged part is provided in a valve 46a.

The protrusion 41h as an engaged part extending along a circumferential direction is provided on an outer circumferential surface of the valve 46a of a first cap 47b. The protrusion 41b protrudes from the outer circumferential surface of the valve 46a. A recess 85b as an engaging part is formed in an inner circumferential surface of a curved part 81b of a first bracket main body 80b of a bracket 70b. A recess 95b as an engaging part is formed in an inner circumferential surface of a curved part 91b of a second bracket main body 90b. The protrusion 41b matches the shapes of the recesses 85b, 95b. The protrusion 41b and the recesses 85b, 95b are fitted and engaged with each other through the rubber members G1, G2. Thus, movement of the first gas tank 40 in the longitudinal direction PD1 can be restricted by the protrusion 41h and the recesses 85b, 95b.

B-5. Fifth Modified Aspect of Engaging Parts and Engaged Part

Figure 17:
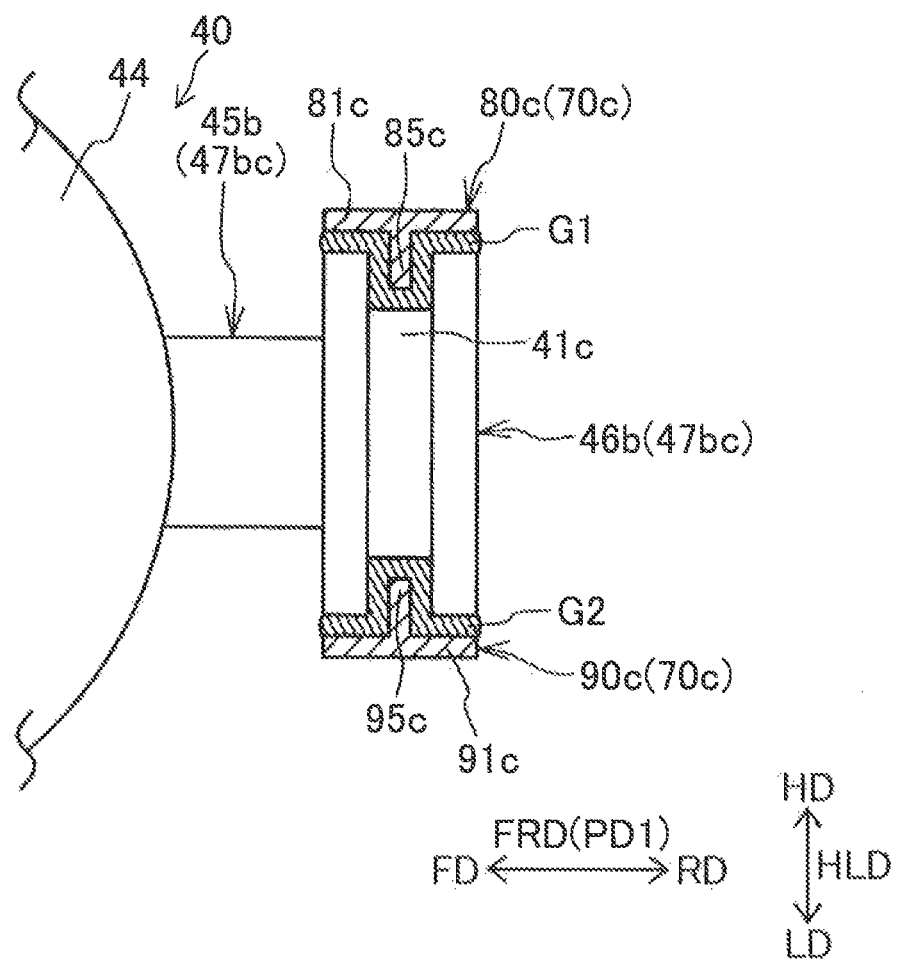
FIG. 17 is a schematic view illustrating a fifth modified aspect of the engaging parts and the engaged part.

FIG. 17 is a schematic view illustrating a fifth modified aspect of the engaging parts and the engaged part. FIG. 17 corresponds to FIG. 12. The same components as in the above embodiment and modified aspects will be denoted by the same reference signs while description thereof will be omitted. In the fifth modified aspect, a recess 41c as an engaged part is provided in a valve 46b.

The recess 41c as an engaged part extending along a circumferential direction is formed in an outer circumferential surface of the valve 46b of a first cap 47bc. The recess 41c is recessed from the outer circumferential surface of the valve 46b. A curved part 81c of a first bracket main body 80c of a bracket 70c has a protrusion 85c as an engaging part that protrudes from an inner circumferential surface of the curved part 81c toward the valve 46b. A curved part 91c of a second bracket main body 90c has a protrusion 95c as an engaging part that protrudes from an inner circumferential surface of the curved part 91c toward the valve 46h. The recess 41c matches the shapes of the protrusions 85c, 95c. The recess 41c and the protrusions 85c, 95c are fitted and engaged with each other through the rubber members G1, G2. Movement of the first gas tank 40 in the longitudinal direction PD1 can be restricted by the recess 41c and the protrusions 85c, 95c.

B-6. Sixth Modified Aspect of Engaging Parts and Engaged Part

Figure 18:
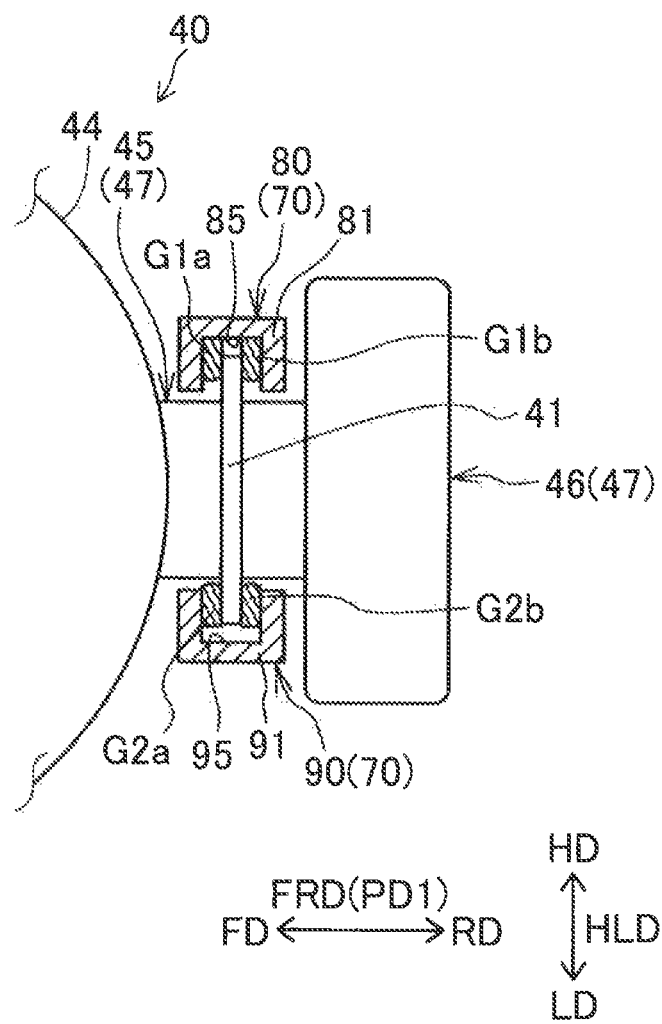
FIG. 18 is a schematic view illustrating a sixth modified aspect of the engaging parts and the engaged part.

FIG. 18 is a schematic view illustrating a sixth modified aspect of the engaging parts and the engaged part. FIG. 18 corresponds to FIG. 12. The same components as in the above embodiment and modified aspects will be denoted by the same reference signs while description thereof will be omitted.

Two rubber members G1a, G1b are interposed between the protrusion 41 and the recess 85. Specifically, the rubber member G1a is interposed between one inner surface of the recess 85 and one outer surface of the protrusion 41, and the rubber member G1b is interposed between the other inner surface of the recess 85 and the other outer surface of the protrusion 41. Similarly, a rubber member G2a is interposed between one inner surface of the recess 95 and one outer surface of the protrusion 41, and a rubber member G2b is interposed between the other inner surface of the recess 95 and the other outer surface of the protrusion 41. There is no rubber interposed between the inner bottom surfaces of the recesses 85, 95 and the outer circumferential surface of the protrusion 41. In this way, too, movement of the first gas tank 40 in the longitudinal direction PD1 can be restricted by the protrusion 41 and the recesses 85, 95.

B-7. Seventh Modified Aspect of Engaging Parts and Engaged Part

Figure 19:
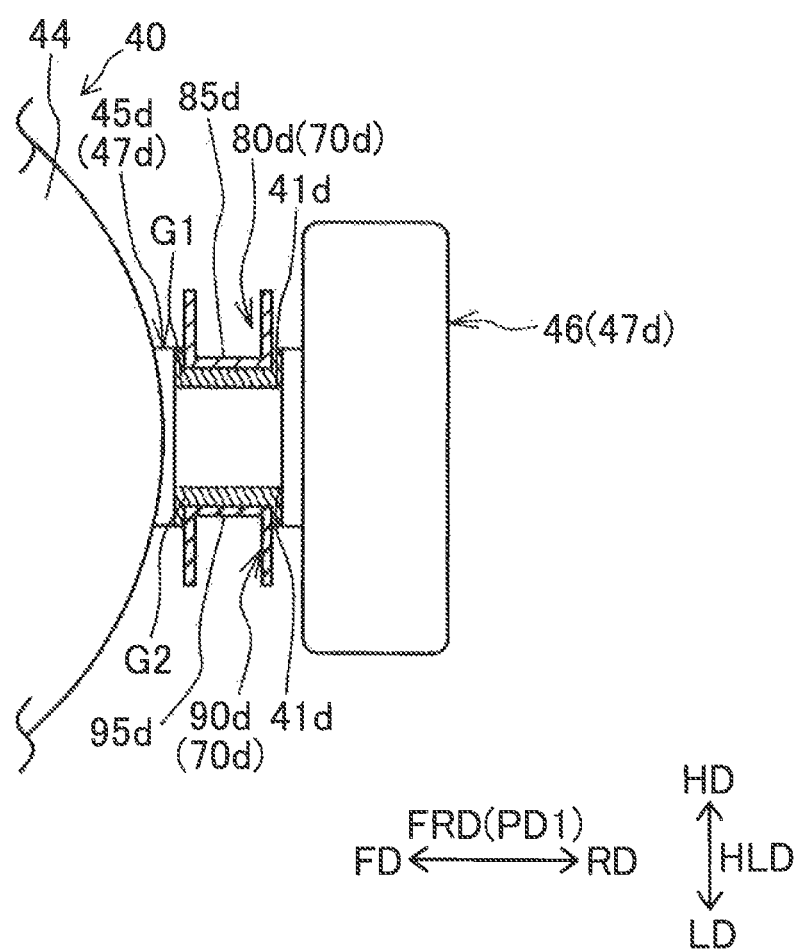
FIG. 19 is a schematic view illustrating a seventh modified aspect of the engaging parts and the engaged part.

FIG. 19 is a schematic view illustrating a seventh modified aspect of the engaging parts and the engaged part. FIG. 19 corresponds to FIG. 12. The same components as in the above embodiment and modified aspects will be denoted by the same reference signs while description thereof will be omitted.

A bracket 70d has a thin plate-like first bracket main body 80d and a thin plate-like second bracket main body 90d. The first bracket main body 80d is bent so as to form a protrusion 85d as an engaging part. The second bracket main body 90d is bent so as to form a protrusion 95d as an engaging part. The protrusions 85d, 95d protrude toward a cap main body 45d. A first cap 45d has a recess 41d recessed from an outer circumferential surface of the cap main body 45d. The recess 41d functions as an engaged part and extends along a circumferential direction of the cap main body 45d. The recess 41d matches the shapes of the protrusions 85d, 95d. The recess 41d and the protrusions 85d, 95d are fitted and engaged with each other through the rubber members G1, G2. Movement of the first gas tank 40 in the longitudinal direction PD1 can be restricted by the recess 41d and the protrusions 85d, 95d.

B-8. Eighth Modified Aspect of Engaging Parts and Engaged Part

Figure 20:
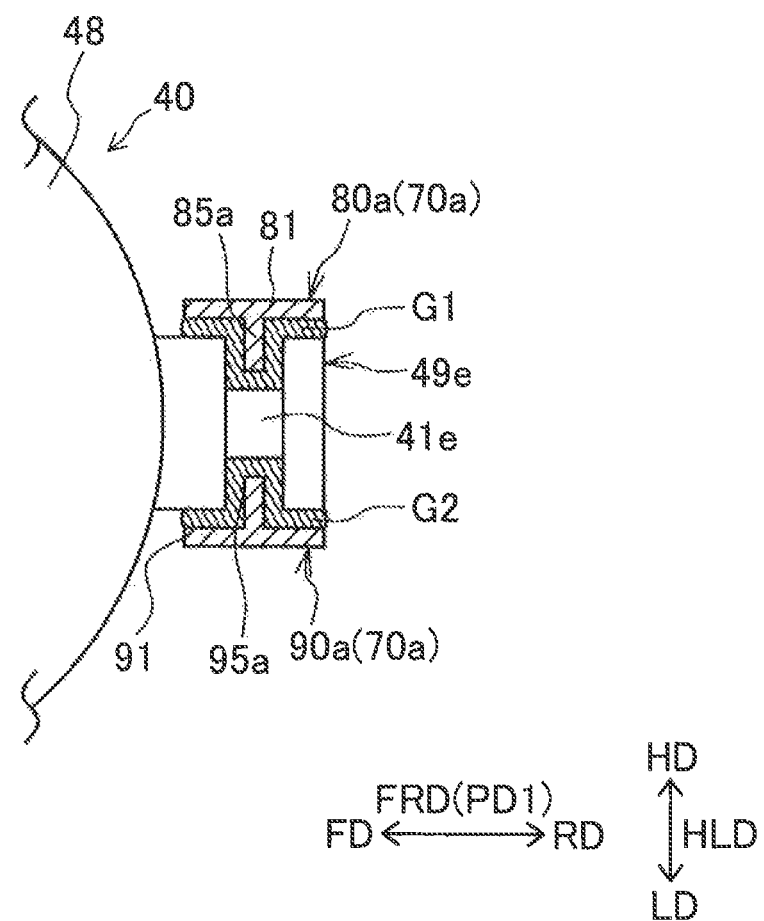
FIG. 20 is a schematic view illustrating an eighth modified aspect of the engaging parts and the engaged part.

FIG. 20 is a schematic view illustrating an eighth modified aspect of the engaging parts and the engaged part. FIG. 20 corresponds to FIG. 12. The same components as in the above embodiment and modified aspects will be denoted by the same reference signs while description thereof will be omitted. In the eighth modified aspect, an example is shown in which a recess 41e as an engaged part is formed in a second cap 49e that has no valve. In the eighth modified aspect, the direction of the first gas tank 40 is opposite in the front-rear direction FRD from that in the above embodiment. Accordingly, the second cap 49e is located further on the rear side than the first cap 47 (FIG. 4).

The recess 41e as an engaged part extending along a circumferential direction is formed in an outer circumferential surface of the second cap 49e. The recess 41e is recessed from the outer circumferential surface of the second cap 49e. The recess 41e matches the shapes of the protrusions 85a, 95a as engaging parts. The recess 41e and the protrusions 85a, 95a are fitted and engaged with each other through the rubber members G1, G2. Movement of the first gas tank 40 in the longitudinal direction PD1 can be restricted by the recess 41e and the protrusions 85a, 95a.

C. Specific Examples of Fixing Method of Ring Member 105

Various methods can be adopted as a method of fixing the ring member 105 to the cap main body 45b in the second modified aspect (FIG. 14) among the above-described modified aspects of the engaging parts and the engaged part. Specific examples of the fixing method will be described below.

C-1. First Specific Example of Fixing Method

An external thread is formed in the outer circumferential surface of the cap main body 45b and an internal thread is formed in the inner circumferential surface of the ring member 105. The cap main body 45b and the ring member 105 are fixed together by the external thread and the internal thread. Thus, the ring member 105 can be fixed by a simple configuration, which leads to cost reduction.

C-2. Second Specific Example of Fixing Method

Figure 21:
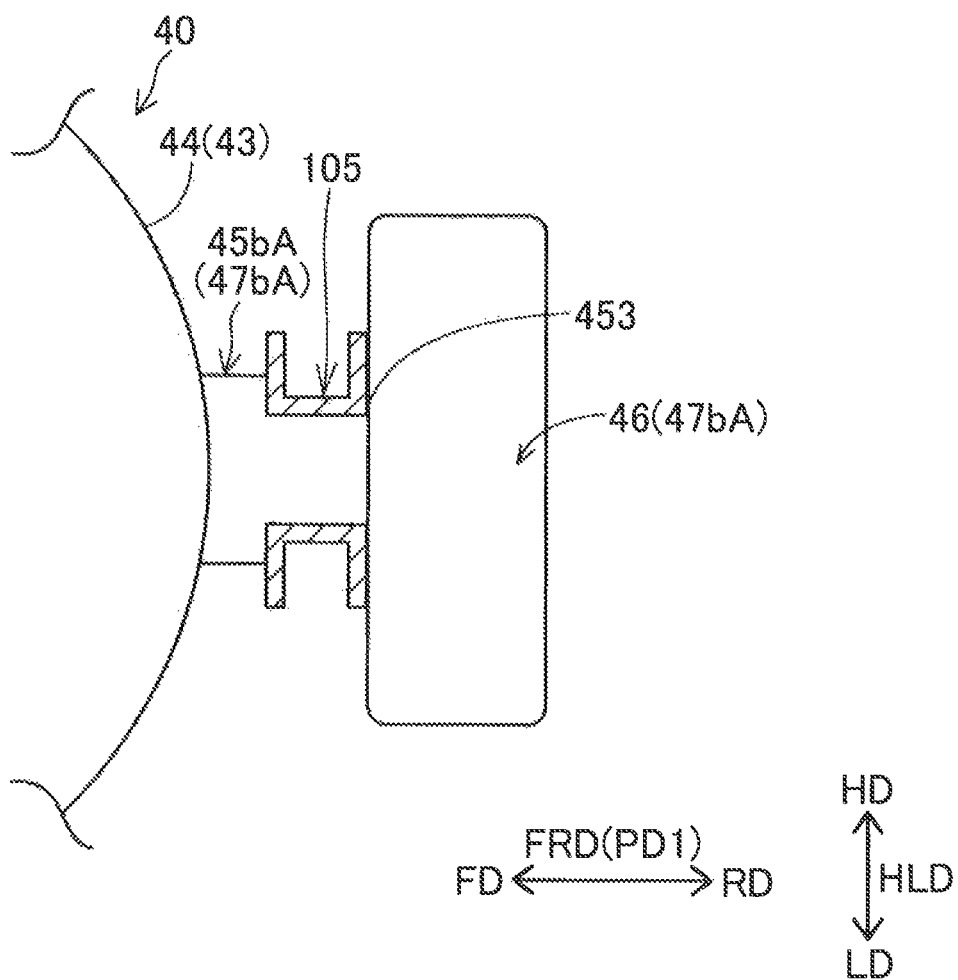
FIG. 21 is a schematic view illustrating a second specific example of a fixing method.

FIG. 21 is a schematic view illustrating a second specific example of the fixing method. The same components as in the second modified aspect will be denoted by the same reference signs while description thereof will be omitted. In FIG. 21, the rubber members G1, G2 and the bracket 70a are not shown. A first cap 47bA has a cap main body 45bA with a step 453. The step 453 is formed at an end of the cap main body 45bA opposite from an end connected to the tank main body 43. The step 453 is formed along a circumferential direction of the cap main body 45bA. Thus, a diameter of the step 453 in the cap main body 45bA is smaller than a diameter of a portion of the cap main body 45bA located further on the side of the tank main body 43 than the step 453. After the ring member 105 is arranged on the step 453, the valve 46 is inserted into the cap main body 45bA, and thereby the ring member 105 is sandwiched between the cap main body 45bA and the valve 46 in the longitudinal direction PD1. Thus, the ring member 105 is fixed to the cap main body 45bA. According to this specific example, the ring member 105 can be fixed by a simple configuration where the cap main body 45bA is provided with the step 453, which leads to cost reduction.

D. Specific Examples of Fixing Method of Ring Member 105a

Various methods can be adopted as a method of fixing the ring member 105a to the cap main body 45b in the third modified aspect (FIG. 15) among the above-described modified aspects of the engaging parts and the engaged part. Specific examples of the fixing method will be described below.

D-1. Specific Example of Fixing Method

An external thread is formed in the outer circumferential surface of the cap main body 45b and an internal thread is formed in the inner circumferential surface of the ring member 105a. The cap main body 45b and the ring member 105a are fixed together by the external thread and the internal thread. Thus, the ring member 105a can be fixed by a simple configuration, which leads to cost reduction. It is preferable that the inner circumferential surface of the ring member 105a has a certain length in the longitudinal direction PD1 so that the internal thread can be formed therein.

D-2. Second Specific Example of Fixing Method

Figure 22:
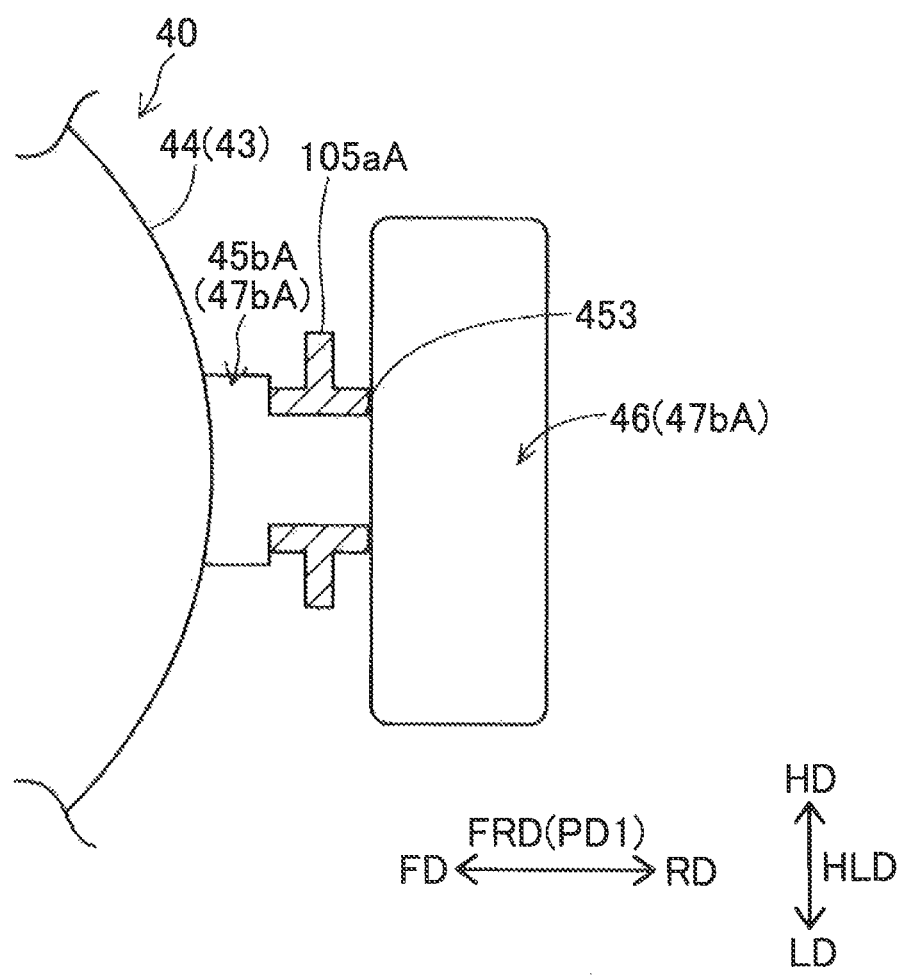
FIG. 22 is a schematic view illustrating the second specific example of the fixing method.

FIG. 22 is a schematic view illustrating a second specific example of the fixing method. In FIG. 22, the rubber members G1, G2 and the bracket 70a are not shown. The first cap 47bA has the same shape as in the second specific example of the fixing method of the ring member 105 (FIG. 21). Therefore, the same components as in the second specific example of the fixing method of the ring member 105 will be denoted by the same reference signs while description thereof will be omitted.

An inner circumferential surface of a ring member 105aA has a certain length in the longitudinal direction PD1. The ring member 105aA has a la-shape in cross-section parallel to the longitudinal direction PD1. After the ring member 105aA is arranged on the step 453, the valve 46 is inserted into the cap main body 45bA, and thereby the ring member 105aA is sandwiched between the cap main body 45bA and the valve 46 in the longitudinal direction PD1. Thus, the ring member 105aA is fixed to the cap main body 45bA. According to this specific example, the ring member 105aA can be fixed by a simple configuration where the cap main body 45bA is provided with the step 453, which leads to cost reduction.

E. Modified Aspects of Bracket

In the above embodiment, the bracket 70 (FIG. 10, FIG. 11) has the first bracket main body 80, the second bracket main body 90, and the first to fourth fastening members 180a to 180d that fix the first bracket main body 80 and the second bracket main body 90 to the floor panel 12. However, the bracket 70 is not limited to the above embodiment, and may have any configuration where the bracket 70 can fix the first cap 47 to the vehicle body 11 and restrict movement of the first gas tank 40 in the longitudinal direction PD1 by fitting and engaging with the protrusion 41 as an engaged part of the first cap 47. Modified aspects of the bracket 70 will be described below.

E-1. First Modified Aspect of Bracket

An external force in the upward direction HD may be applied to the first gas tank 40 due to collision of the vehicle 10 etc. The first to fourth fastening members 180a to 180d may be configured so as to release the fixed first bracket main body 80 and second bracket main body 90 before an external force so large as to damage the first gas tank 40 (damaging external force) is applied to the first gas tank 40 in such an event.

Specifically, the head and the shank of the bolt 181 may be joined together so that the head of the bolt 181 comes off from the shank when a predetermined external force smaller than the damaging external force is applied to the bolt 181 in the upward direction HD. Alternatively, for example, the nut 183 may be mounted on the bolt 181 so that the nut 183 comes off from the bolt 181 when a predetermined external force smaller than the damaging external force is applied to the nut 183 in the upward direction HD.

The first to fourth fastening members 180a to 180d may each be composed of a pin, such as a hinge pin, instead of the bolt 181 and the nut 183. In this case, the pin has such strength that the pin breaks when a predetermined external force smaller than the damaging external force is applied thereto in the upward direction HD.

According to the first modified aspect of the bracket, the first gas tank 40 can come off from the first bracket main body 80 and the second bracket main body 90 before an external force so large as to damage the first gas tank 40 (damaging external force) is applied to the first gas tank 40. Thus, the damaging external force is less likely to be applied to the first gas tank 40, so that the first gas tank 40 is less likely to be damaged.

E-2. Second Modified Aspect of Bracket

Figure 23:
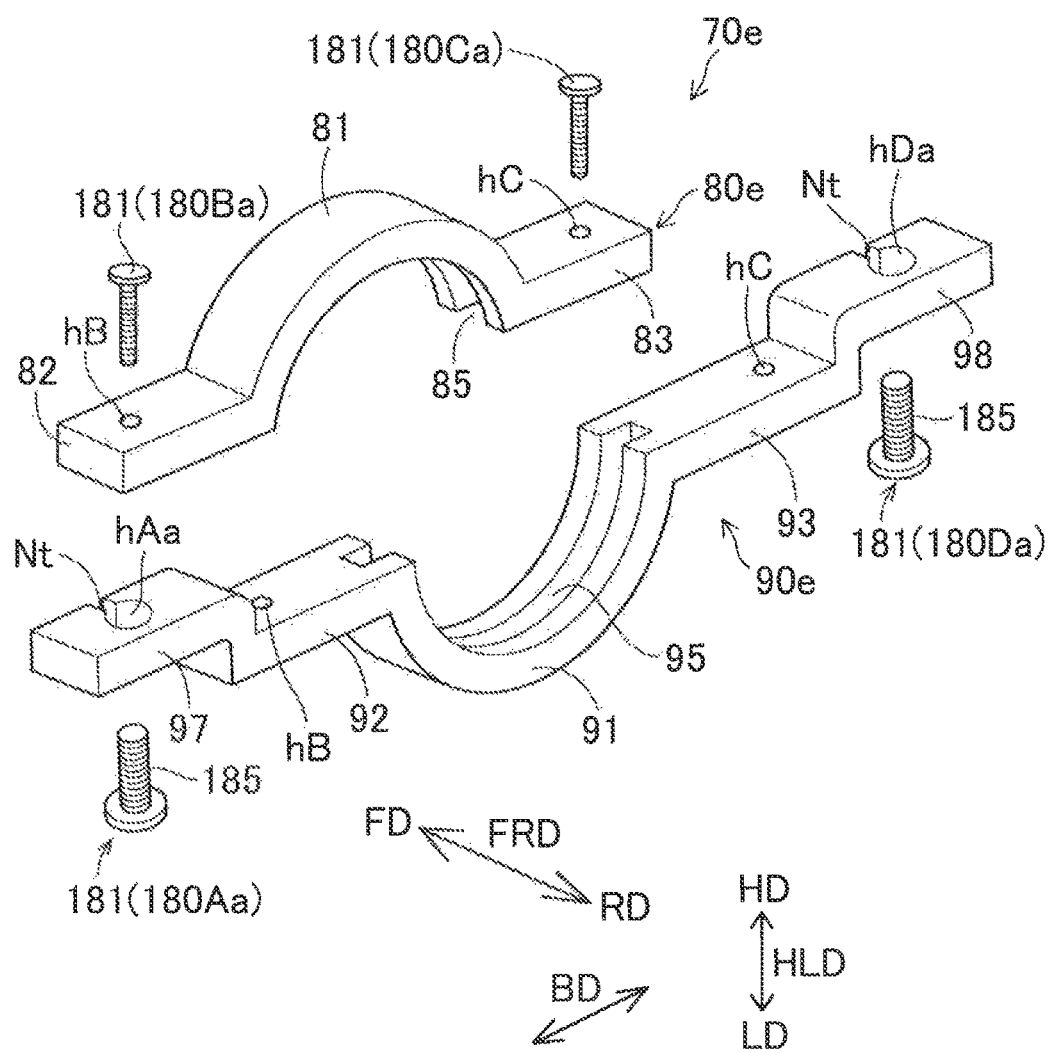
FIG. 23 is a view illustrating a second modified aspect of the bracket.
Figure 24A:
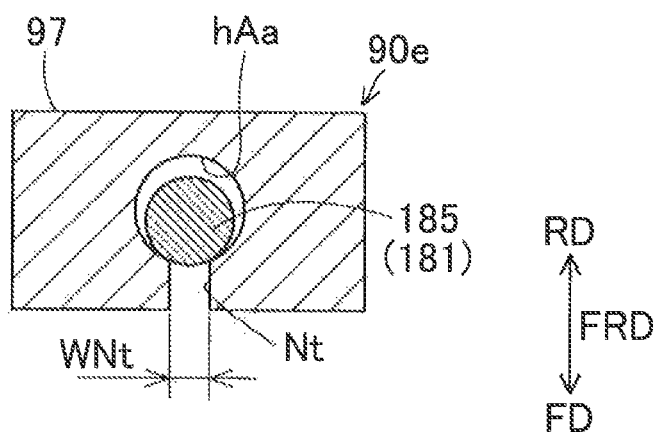
FIG. 24A is a view illustrating an effect of a notch.
Figure 24B:
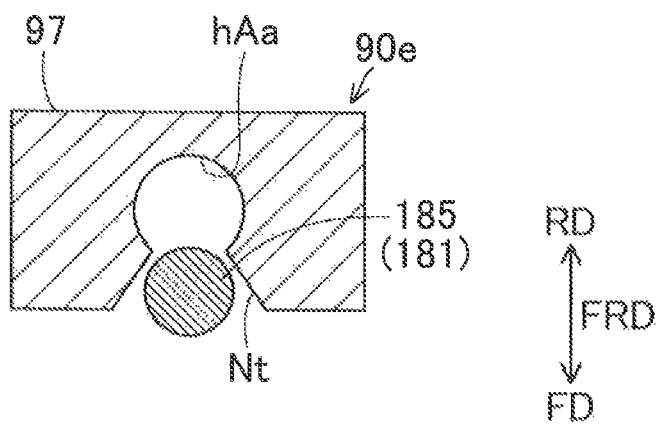
FIG. 24B is a view illustrating the effect of the notch.

FIG. 23 is a view illustrating a second modified aspect of the bracket. FIG. 24A and FIG. 24B are views illustrating an effect of a notch. FIG. 23 is a view corresponding to FIG. 10. FIG. 24A and FIG. 24B show cross-sections of a first fixing part 97 parallel to the front-rear direction FRD and the width direction BD. FIG. 24A shows a state where a shank 185 of the bolt 181 is inserted through a through-hole hAa, and FIG. 24B shows a state where the shank 185 of the bolt 181 has come off from the through-hole hAa. In a bracket 70e of the second modified aspect, the same components as in the bracket 70 of the above embodiment (FIG. 10, FIG. 11) will be denoted by the same reference signs while description thereof will be omitted.

First to fourth fastening members 180Aa to 180Da are each composed of the bolt 181 and the nut (not shown) as in the above embodiment.

As shown in FIG. 23, through-holes hB, hC are respectively formed at the base end 82 and the leading end 83 of a first bracket main body 80e. Through-holes hB, are respectively formed at the base end 92 and the leading end 93 of a second bracket main body 90e. In a state of overlapping in the height direction HLD, the base ends 82, 92 are fixed together by the bolt 181 and the nut (not shown) of the second fastening member 180Ba. In a state of overlapping in the height direction HLD, the leading ends 83, 93 are fixed together by the bolt 181 and the nut (not shown) of the third fastening member 180Ca. However, the first bracket main body 80e and the second bracket main body 90e are not fixed to the floor panel 12 by the second fastening member 180Ba and the third fastening member 180Ca.

The second bracket main body 90e has the first fixing part 97 connected to an end of the base end 92 opposite from a side where the curved part 91 is located, and a second fixing part 98 connected to an end of the leading end 93 opposite from a side where the curved part 91 is located.

The first fixing part 97 has a through-hole hAa and a notch Nt. The through-hole hAa penetrates in a thickness direction (height direction HLD of the vehicle 10). The bolt 181 of the first fastening member 180Aa is inserted through the through-hole hAa of the first fixing part 97 and a through-hole of the floor panel 12, and the nut is mounted on the bolt 181 in this inserted state. The notch Nt extends from the through-hole hAa to a side surface on the front side of the first fixing part 97. As with the through-hole hAa, the notch Nt penetrates the first fixing part 97 in the thickness direction.

The second fixing part 98 (FIG. 23) has a through-hole hDa and a notch Nt. The through-hole hDa penetrates in a thickness direction (height direction HLD of the vehicle 10). The bolt 181 of the fourth fastening member 180Da is inserted through the through-hole hDa of the second fixing part 98 and a through-hole of the floor panel 12, and the nut is mounted on the bolt 181 in this inserted state. The notch Nt extends from the through-hole hDa to a side surface on the front side of the second fixing part 98. As with the through-hole hDa, the notch Nt penetrates the second fixing part 98 in the thickness direction.

As shown in FIG. 24A, a width WNt of the notch Nt is smaller than a diameter of the shank 185 of the bolt 181. The notch Nt is set so as to open wider than the diameter of the shank 185 when a predetermined external force in the frontward direction FD smaller than the external force so large as to damage the first gas tank 40 (damaging external force) is applied by the bolt 181. For example, this setting can be made by adjusting the material and shape of the second bracket main body 90e forming the notch Nt. As the shank 185 passes through the notch Nt, the second bracket main body 90e comes off from the bolts 181. The example of FIG. 2.4A and FIG. 24B shows how the second bracket main body 90e comes off from the bolts 181 when an external force in the rearward direction RD is applied to the second bracket main body 90e due to collision of the vehicle 10 etc.

Thus, when an external force equal to or larger than a predetermined force in the frontward direction FD is applied to the notch Nt by the bolt 181 as the second bracket main body 90e tries to move in the rearward direction RD, the second bracket main body 90e comes off from the bolts 181, causing the first gas tank 40 fixed to the vehicle body 11 by the bracket 70e to be released. Accordingly, the first gas tank 40 is less likely to be damaged by a large external force applied thereto, as the first gas tank 40 fixed to the vehicle body 11 by the bracket 70e is released before the damaging external force is applied to the first gas tank 40.

While the notches Nt extend from the through-holes hAa, hDa to the side surfaces on the front side of the first fixing part 97 and the second fixing part 98, the notches Nt may instead extend to side surfaces on the rear side of the first fixing part 97 and the second fixing part 98. Thus, when a predetermined external force is applied to the notches Nt in the rearward direction RD by the bolts 181, the second bracket main body 90e comes off from the bolts 181, causing the first gas tank 40 fixed to the vehicle body 11 by the bracket 70e to be released. Accordingly, the first gas tank 40 is less likely to be damaged, as the first gas tank 40 fixed to the vehicle body 11 by the bracket 70e is released before a large external force is applied to the first gas tank 40. Alternatively, the notches Nt may extend from the through-holes hAa, hDa to both side surfaces of the first fixing part 97 and the second fixing part 98, namely the side surfaces on the front side and the side surfaces on the rear side.

Figure 25:
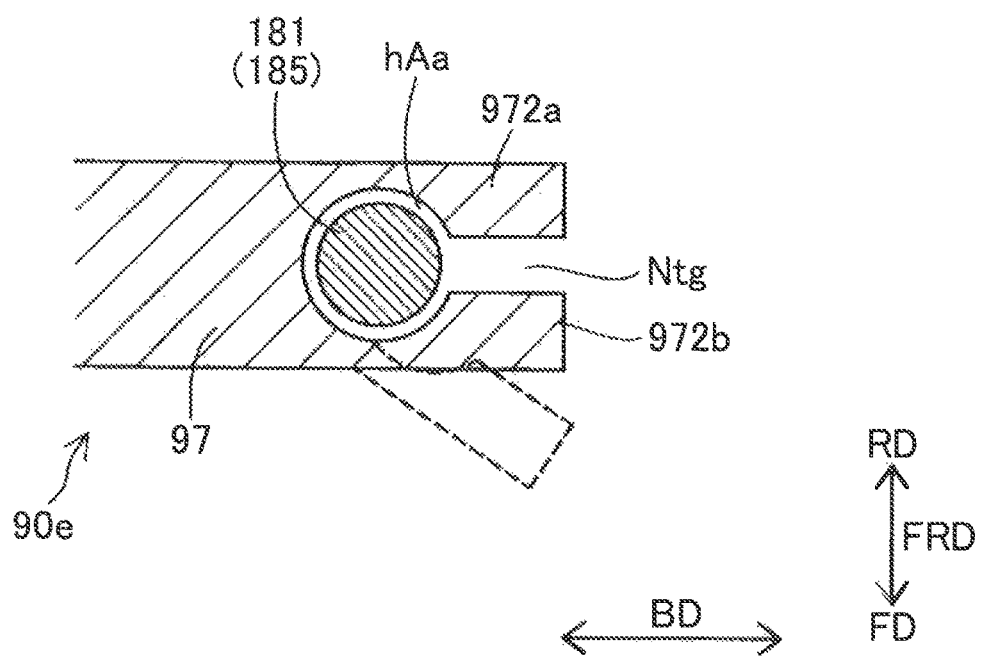
FIG. 25 is a view illustrating a modified example of the notch.

FIG. 25 is a view illustrating a modified example of the notch. FIG. 25 is a view corresponding to FIG. 24A and FIG. 24B. In the second modified aspect of the bracket 70e, the notches Nt extend in the front-rear direction FRD from the through-holes hAa, hDa, but the notches are not limited to this example. As shown in FIG. 25, a notch Ntg may extend from the through-hole hAa to an end face of the first fixing part 97 in the width direction BD. Similarly, a notch Ntg formed in the second fixing part 98 may also extend from the through-hole hDa to an end face of the second fixing part 98 in the width direction BD. Portions 972a, 972b of the first fixing part 97 that define the notch Ntg are designed to deform to such an extent that the shank 185 comes off from the second bracket main body 90e when a predetermined external force is applied to the portions 972a, 972b in the front-rear direction FRD. In the example shown in FIG. 25, the shank 185 comes off from the second bracket main body 90e as the portion 972b deforms as indicated by the dashed line when a predetermined external force in the rearward direction RD is applied to the second bracket main body 90e due to collision of the vehicle 10 etc. The notch formed in the second fixing part 98 has the same configuration as the notch Ntg formed in the first fixing part 97.

In the case where the notches Nt, Ntg are provided in the second bracket main body 90e as shown in FIG. 23 to FIG. 25, a support member that supports the barrel part 42 of the first gas tank 40 from the lower side may be provided. It is preferable that the support member is arranged on the barrel part 42 further on the one end side of the first gas tank 40 (side where the bracket 70e is located) than the center in the longitudinal direction PD1. If the support member is thus provided, the first gas tank 40 can be prevented from dropping at the one end side when the second bracket main body 90e comes off from the vehicle body 11. It is not necessary that the support member is always in contact with the barrel part 42, and the support member may be arranged further on the lower side than the barrel part 42, with a clearance left between the support member and the barrel part 42 so that the support member is not damaged due to impact of the dropping barrel part 42. Alternatively, the support member may have a function of enhancing the strength of the vehicle 10 by being connected to the frame 18 (FIG. 2) etc. of the vehicle 10.

E-3. Third Modified Aspect of Bracket

Figure 26:
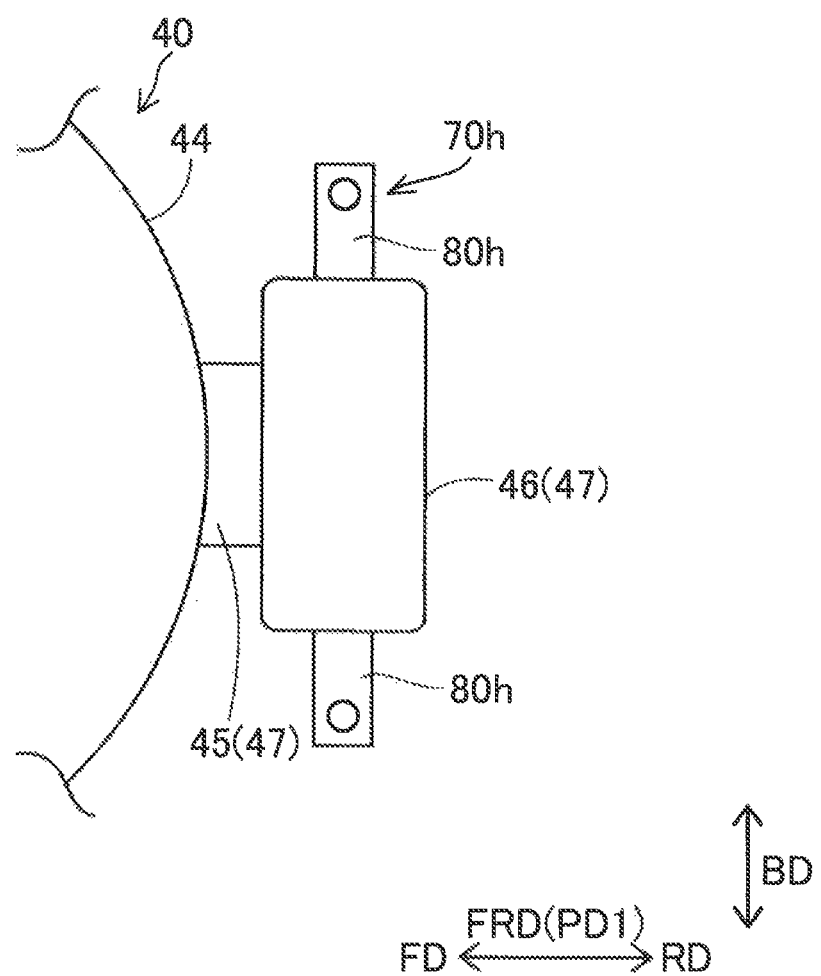
FIG. 26 is a view illustrating a third modified aspect of the bracket.

FIG. 26 is a view illustrating a third modified aspect of the bracket 70. In the above embodiment, the first cap 47, the first bracket main body 80, and the second bracket main body 90 are separate bodies (FIG. 10, FIG. 11), but the bracket 70 is not limited to this example. For example, as shown in FIG. 26, a bracket main body 80h of a bracket 70h may be integrated with the valve 46 of the first cap 47 by welding or casting. The bracket main body 80h is a plate-like member protruding from the outer circumferential surface of the valve 46 in the width direction BD. The bracket main body 80h is fixed to the vehicle body 11 by a fastening member such as a bolt and a nut. The bracket main bodies of the brackets 70, 70a to 70h of the above embodiment and modified aspects (e.g., the first bracket main body 80 and the second bracket main body 90 of the embodiment) are fixed to the vehicle body 11 by the first to fourth fastening members 180a to 180d, but may be fixed by welding etc. Instead of by the first to fourth fastening members 180a to 180d.

F. Modified Examples, F-1. First Modified Example

In the above embodiment, the first gas tank 40 is arranged inside the center tunnel 20 so that the longitudinal direction PD1 of the first gas tank 40 is parallel to the front-rear direction FRD of the vehicle 10 (FIG. 6). However, the first gas tank 40 is not limited to being arranged so that the longitudinal direction PD1 and the front-rear direction FRD are parallel, but can be arranged inside the center tunnel 20 so that the longitudinal direction PD1 extends along the front-rear direction FRD. "The longitudinal direction PD1 extends along the front-rear direction FRD" means a state where the longitudinal direction PD1 extends at an angle of within ±20° relative to the front-rear direction FRD. In the above embodiment, the second gas tank 50 is arranged inside the second gas tank arrangement part 30 so that the longitudinal direction PD2 of the second gas tank 50 is parallel to the width direction BD of the vehicle 10 (FIG. 6). However, the second gas tank 50 is not limited to being arranged so that the longitudinal direction PD2 and the width direction BD are parallel, but can be arranged inside the second gas tank arrangement part 30 so that the longitudinal direction PD2 extends along the width direction BD. "The longitudinal direction PD2 extends along the width direction BD" means a state where the longitudinal direction PD2 extends at an angle of within ±20° relative to the width direction BD.

F-2. Second Modified Example

The second gas tank 50 is arranged on the rear side of the first gas tank 40 (FIG. 6) in the above embodiment, but the second gas tank 50 may instead be arranged on the front side of the first gas tank 40. In this case, it is preferable that the second cap 49, instead of the first cap 47, is fixed to the vehicle body 11 by the bracket 70 so that the first gas tank 40 does not move toward the second gas tank 50 due to impact etc. In the above embodiment, the vehicle 10 has the second gas tank 50, but the second gas tank 50 may be omitted.

F-3. Third Modified Example

In the above embodiment, the vehicle 10 is a fuel cell electric vehicle equipped with the fuel cell 19, and the first gas tank 40 and the second gas tank 50 contain hydrogen that is a fuel gas as a filling. However, the present disclosure is not limited to this example. For example, the vehicle 10 may be an LPG vehicle fueled by a liquefied petroleum gas, in this case, the first gas tank 40 and the second gas tank 50 contain an LP gas that is a fuel gas as a filling.

F-4. Fourth Modified Example

In the above embodiment, the band main body fastening member 63 fastens up the first upper band main body 61 and the second upper band main body 62 by fixing together the first upper band main body 61 and the second upper band main body 62 at a position on the upper side of the barrel part 42. However, the position of the band main body fastening member 63 is not limited to this example. For example, the band main body fastening member 63 may be arranged at a position on a lateral side of the barrel part 42 in the width direction BD. In this case, the first upper hand main body 61 and the second upper band main body 62 may be formed as an integral band by omitting the second fastening portion 615 and the second fastening portion 625 (FIG. 8), and, for example, the first fastening portion 624 (FIG. 8) and the second lower band fastening portion 646 of the lower band main body 64 may be fixed together by the band main body fastening member 63.

In the above embodiment, the band 60 holds the barrel part 42 by surrounding the outer circumferential surface of the barrel part 42 with the first upper band main body 61, the second upper band main body 62, and the lower band main body 64. However, the band 60 is not limited to the above embodiment, and may have any configuration that can hold the barrel part 42 by surrounding the outer circumferential surface of the barrel part 42. For example, the hand 60 may have a ring-shaped member that comes in contact with the outer circumferential surface of the barrel part 42 in the circumferential direction, and may hold the barrel part 42 by this ring-shaped member. The ring-shaped member is fixed to the vehicle body 11 by a fastening member such as a bolt and a nut.

F-5. Fifth Modified Example

Figure 27:
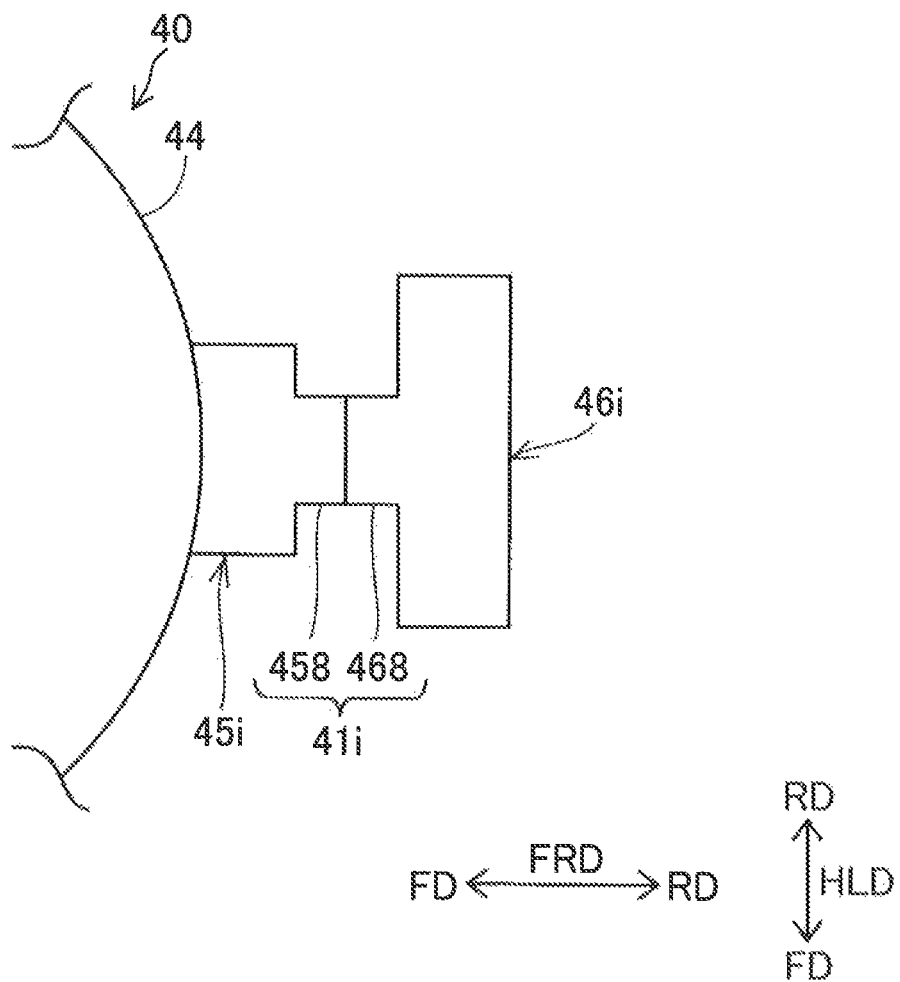
FIG. 27 is a view illustrating a modified example of a recess.

In the seventh modified aspect of the engaging parts and the engaged part described with FIG. 19, the recess 41d as an engaged part has a shape recessed from the outer circumferential surface of the cap main body 45d. However, the engaged part is not limited to that of the seventh modified aspect, and may have any shape that can form the recess 41d. FIG. 27 is a view illustrating a modified example of the recess. As shown in FIG. 27, a step 468 forming a part of a recess 41i is formed in a valve 46i, and a step 458 forming another part of the recess 41i is formed in a cap main body 451. The recess 41i may be formed by the two steps 468, 458.

The first gas tank 40 is arranged inside the center tunnel 20 and the second gas tank 50 is arranged inside the second gas tank arrangement part 30 in the above embodiment, but the arrangement of these gas tanks is not limited to this example. The first gas tank 40 and the second gas tank 50 may instead be arranged at other positions in the vehicle 10 (e.g., in the front room 110).

The present disclosure is not limited to the above embodiment but includes various modified examples. For example, the above embodiment has been described in detail to make the present disclosure understandable, and the disclosure is not necessarily limited to an embodiment that includes all the components described. Some of the components of one embodiment can be replaced with the components of other modified aspects, and some components of other modified aspects may be added to the components of one embodiment. For each embodiment, other components may be added to the components or some of the components may be omitted or replaced. Moreover, the embodiment, modified aspects, and modified examples may be combined.

What is claimed is:

1. A vehicle comprising:
a vehicle body including a floor panel forming a floor of a vehicle interior;
a gas tank having a tank main body that includes a cylindrical barrel part and a cap that is provided at one end of the tank main body in a longitudinal direction;
a bracket fixing the cap to the vehicle body; and
a band surrounding an outer circumferential surface of the barrel part and fixing the barrel part to the vehicle body, wherein
the gas tank is arranged such that the longitudinal direction extends along a front-rear direction of the vehicle,
the bracket includes an engaging part that restricts movement of the gas tank in the longitudinal direction by engaging with an engaged part provided in the cap,
movement of the gas tank in the longitudinal direction is restricted by the engaging part only at the one end, and not at the other end, of the gas tank in the longitudinal direction,
the floor panel includes a center tunnel which extends in the front-rear direction and protrudes toward the vehicle interior and on an inside of which the gas tank is arranged,
the center tunnel includes a first tunnel and a second tunnel that is connected to a rear end of the first tunnel in the front-rear direction and extends toward the rear side,
the barrel part is surrounded by the band at a position in the first tunnel in the front-rear direction, and
in a cross-section orthogonal to the front-rear direction, a cross-sectional area inside the first tunnel at a portion where the band is located is larger than a cross-sectional area inside the second tunnel.

2. The vehicle according to claim 1, further comprising a second gas tank that is located further on a front side or a rear side than the gas tank in the front-rear direction and arranged such that a longitudinal direction extends along a width direction of the vehicle, wherein, in the front-rear direction, the cap is located on a side closer to the second gas tank than the other end of the gas tank in the longitudinal direction.

3. The vehicle according to claim 1, wherein
the cap includes a cap main body that is inserted into the tank main body and forms a communication hole to provide communication between an outside and an inside of the tank main body, and a valve that is mounted on the cap main body and opens and closes the communication hole, and
the engaged part is provided in one of the cap main body and the valve, and the engaging part of the bracket engage with the engaged part provided in one of the cap main body and the valve.

4. The vehicle according to claim 1, wherein
the engaged part includes a first protrusion or a first recess, and
the engaging part of the bracket includes a second recess engaging with the first protrusion or a second protrusion engaging with the first recess.

5. The vehicle according to claim 4, further comprising a buffer member arranged between the first protrusion and the second recess or between the first recess and the second protrusion.

6. The vehicle according to claim 1, wherein the bracket includes a bracket main body that are arranged such that the bracket main body surrounds an outer circumferential surface of the cap, clamp the cap, and includes the engaging part, and a fastening member that fix the bracket main body to the vehicle body.

7. The vehicle according to claim 1, wherein the band surrounds the barrel part at a portion that is located on a side opposite from a side where the cap is located across a center of the barrel part in the longitudinal direction of the gas tank.

8. A vehicle comprising:
a vehicle body, wherein the vehicle body includes a floor panel forming a floor of a vehicle interior;
a gas tank having a tank main body that includes a cylindrical barrel part and a cap that is provided at one end of the tank main body in a longitudinal direction;
a bracket fixing the cap to the vehicle body; and
a band surrounding an outer circumferential surface of the barrel part and fixing the barrel part to the vehicle body, wherein
the gas tank is arranged such that the longitudinal direction, extends along a front-rear direction of the vehicle,
the bracket includes an engaging part that restricts movement of the gas tank in the longitudinal direction by engaging with an engaged part provided in the cap,
movement of the gas tank in the longitudinal direction is restricted by the engaging part only at the one end, and not at the other end, of the gas tank in the longitudinal direction,
the floor panel includes a center tunnel which extends in the front-rear direction and protrudes toward the vehicle interior and on an inside of which the gas tank is arranged,
the center tunnel includes a first tunnel and a second tunnel that is connected to a rear end of the first tunnel in the front-rear direction and extends toward the rear side,
the band includes a band main body that is arranged so as to surround the barrel part in a circumferential direction, and a band main body fastening member that is located further on an upper side than the barrel part and fastens up the band main body,
the barrel part is surrounded by the band at a position in the first tunnel in the front-rear direction of the vehicle, and
in a cross-section orthogonal to the front-rear direction, a height of a cross-section inside the first tunnel at a portion where the band is located is larger than a height of a cross-section inside the second tunnel.

* * * * *